(12) United States Patent
Kleeman

(10) Patent No.: US 11,237,276 B2
(45) Date of Patent: Feb. 1, 2022

(54) SYSTEM AND METHOD FOR GAUSSIAN PROCESS ENHANCED GNSS CORRECTIONS GENERATION

(71) Applicant: Swift Navigation, Inc., San Francisco, CA (US)

(72) Inventor: Alexander Kleeman, San Francisco, CA (US)

(73) Assignee: Swift Navigation, Inc., San Francisco, CA (US)

( * ) Notice: Subject to any disclaimer, the term of this patent is extended or adjusted under 35 U.S.C. 154(b) by 0 days.

(21) Appl. No.: 16/983,706

(22) Filed: Aug. 3, 2020

(65) Prior Publication Data

US 2021/0033735 A1 Feb. 4, 2021

Related U.S. Application Data

(60) Provisional application No. 62/881,520, filed on Aug. 1, 2019.

(51) Int. Cl.
| | | |
|---|---|---|
| *G01S 19/40* | (2010.01) | |
| *G01S 19/07* | (2010.01) | |
| *G01S 19/41* | (2010.01) | |
| *G01S 19/13* | (2010.01) | |

(52) U.S. Cl.
CPC ............ *G01S 19/40* (2013.01); *G01S 19/071* (2019.08); *G01S 19/072* (2019.08); *G01S 19/073* (2019.08); *G01S 19/41* (2013.01); *G01S 19/13* (2013.01)

(58) Field of Classification Search
CPC ...... G01S 19/07; G01S 19/071; G01S 19/072; G01S 19/073; G01S 19/074
See application file for complete search history.

(56) References Cited

U.S. PATENT DOCUMENTS

| | | |
|---|---|---|
| 5,610,614 A | 3/1997 | Talbot et al. |
| 6,427,122 B1 | 7/2002 | Lin |
| 6,453,237 B1 | 9/2002 | Fuchs et al. |
| 6,647,340 B1 | 11/2003 | Pemble et al. |
| 6,691,066 B1 | 2/2004 | Brodie |
| 6,856,905 B2 | 2/2005 | Pasturel et al. |
| 6,864,836 B1 | 3/2005 | Hatch et al. |
| 7,026,982 B2 | 4/2006 | Toda et al. |
| 7,219,013 B1 | 5/2007 | Young et al. |

(Continued)

FOREIGN PATENT DOCUMENTS

| | | |
|---|---|---|
| CN | 103760573 A | 4/2014 |
| EP | 0244091 A2 | 11/1987 |

(Continued)

OTHER PUBLICATIONS

Ming Lin, Xiaomin Song, Qi Qian, Hao Li, Liang Sun, Shenghuo Zhu, Rong Jin: Robust Gaussian Process Regression for Real-Time High Precision GPS Signal Enhancement. Jun. 5, 2019. (Year: 2019).*

(Continued)

*Primary Examiner* — Gregory C. Issing
(74) *Attorney, Agent, or Firm* — Jeffrey Schox; Randy Mehlenbacher

(57) ABSTRACT

A system and method for generating a set of GNSS corrections using a GNSS corrections model comprising a Gaussian process.

20 Claims, 6 Drawing Sheets

(56) References Cited

U.S. PATENT DOCUMENTS

| | | | |
|---|---|---|---|
| 7,289,061 B2* | 10/2007 | Komjathy | G01S 19/08 |
| | | | 342/357.31 |
| 7,292,183 B2 | 11/2007 | Bird et al. | |
| 7,696,922 B2 | 4/2010 | Nicholson et al. | |
| 8,094,065 B2 | 1/2012 | Henkel | |
| 8,193,976 B2 | 6/2012 | Shen et al. | |
| 8,610,624 B2 | 12/2013 | Savoy | |
| 8,760,343 B2 | 6/2014 | Milyutin et al. | |
| 8,825,456 B2* | 9/2014 | Vasudevan | G06T 7/521 |
| | | | 703/2 |
| 9,069,073 B2 | 6/2015 | Ramakrishnan et al. | |
| 9,128,176 B2* | 9/2015 | Seeger | G01S 19/44 |
| 9,405,012 B2 | 8/2016 | Doucet et al. | |
| 9,557,422 B1* | 1/2017 | Miller | G01S 19/073 |
| 9,784,844 B2 | 10/2017 | Kana et al. | |
| 10,101,464 B2 | 10/2018 | Appleford et al. | |
| 11,156,718 B2 | 10/2021 | Takeda | |
| 2005/0001762 A1 | 1/2005 | Han et al. | |
| 2005/0024263 A1 | 2/2005 | Sharpe et al. | |
| 2009/0018772 A1 | 1/2009 | Watanabe et al. | |
| 2009/0184869 A1 | 7/2009 | Talbot et al. | |
| 2009/0273511 A1 | 11/2009 | Schroth | |
| 2010/0283675 A1 | 11/2010 | McAree et al. | |
| 2011/0148698 A1 | 6/2011 | Vollath | |
| 2011/0187589 A1 | 8/2011 | Gaal et al. | |
| 2011/0187590 A1 | 8/2011 | Leandro | |
| 2012/0154210 A1 | 6/2012 | Landau et al. | |
| 2012/0176271 A1 | 7/2012 | Dai et al. | |
| 2013/0050020 A1 | 2/2013 | Peck et al. | |
| 2013/0227377 A1 | 8/2013 | Rao et al. | |
| 2014/0015712 A1 | 1/2014 | Leandro et al. | |
| 2014/0184442 A1 | 7/2014 | Large et al. | |
| 2014/0240172 A1 | 8/2014 | Milyutin et al. | |
| 2015/0019464 A1 | 1/2015 | Nguyen-Tuong et al. | |
| 2015/0293233 A1 | 10/2015 | De Jong | |
| 2016/0097859 A1 | 4/2016 | Hansen et al. | |
| 2016/0195617 A1 | 7/2016 | Phatak et al. | |
| 2017/0269222 A1 | 9/2017 | Dai et al. | |
| 2017/0299730 A1 | 10/2017 | Lie et al. | |
| 2017/0322313 A1 | 11/2017 | Revol et al. | |
| 2018/0113219 A1 | 4/2018 | Wuebbena | |
| 2018/0120445 A1 | 5/2018 | Dill | |
| 2019/0004180 A1 | 1/2019 | Jokinen | |
| 2019/0154837 A1 | 5/2019 | Noble et al. | |
| 2019/0187298 A1 | 6/2019 | Grgich et al. | |
| 2019/0204450 A1 | 7/2019 | Revol | |
| 2019/0339396 A1 | 11/2019 | Turunen | |
| 2020/0096649 A1 | 3/2020 | Brandl et al. | |
| 2020/0209406 A1* | 7/2020 | Lin | G01S 19/072 |
| 2020/0233056 A1* | 7/2020 | Dolgov | B61L 23/34 |

FOREIGN PATENT DOCUMENTS

| | | | | |
|---|---|---|---|---|
| EP | 2602752 A1 * | 6/2013 | | G06Q 10/04 |
| EP | 1839070 B2 | 4/2014 | | |
| EP | 3627188 A1 | 3/2020 | | |
| WO | 2017070732 A1 | 5/2017 | | |

OTHER PUBLICATIONS

Satirapod, C. "Improving the GPS Data Processing Algorithm for Precise Static Relative Positioning." School of Surveying and Spatial Information Systems The University of New South Wales. Jan. 2002 . (Year: 2002).*

C. E. Rasmussen & C. K. I. Williams, Gaussian Processes for Machine Learning, the MIT Press, 2006, ISBN 026218253X. c 2006 Massachusetts Institute of Technology. (Year: 2006).*

Huang, P. "Airborne GNSS PPP Based Pseudolite System." School of Civil and Environmental Engineering Faculty of Engineering UNSW. Jun. 2019. (Year: 2019).*

Ko, Jonathan & Klein, Daniel & Fox, Dieter & Haehnel, D.. (2007). GP-UKF: Unscented kalman filters with Gaussian process prediction and observation models. 1901-1907. 10.1109/IROS.2007.4399284. (Year: 2007).*

Ming Lin, Xiaomin Song, Qi Qian, Hao Li, Liang Sun, Shenghuo Zhu, Rong Jin: Robust Gaussian Process Regression for Real-Time High Precision GPS Signal Enhancement. KDD 2019: 2838-2847 (Year: 2019).*

"An Introduction to GNSS, Chapter 4, GNSS Error Sources", https://novatel.com/an-introduction-to-gnss/chapter-4-gnsserror-sources, published 2015.

"Integrity monitoring for mobile users in urban environment", https://gssc.esa.int/navipedia/index.php/Integrity.

"Phase II of the GNSS Evolutionary Architecture Study", https://www.faa.gov/about/office_org/headguarters_offices/ato/service_units/techops/navservices/gnss/library/documents/media/geasphaseii_final.pdf, Feb. 2010.

Brocard, Philippe , "Integrity monitoring for mobile users in urban environment", https://tel.archives-ouvertes.fr/tel-01379632, Oct. 11, 2016.

Chiu, David S. , et al., "Bierman-Thorton UD Filtering for Double-Differenced Carrier Phase Estimation Accounting for Full Mathematical Correlation", Jan. 2008, ION NTM 2008, pp. 756-762., Jun. 23, 2017 00:00:00.0.

Gratton, Livio , et al., "Carrier Phase Relative RAIM Algorithms and Protection Level Derivation", Journal of Navigation (2010), 63, 215-231, doi: 10.1017/S0373463309990403.

Gunning, Kazuma , et al., "Design and evaluation of integrity algorithms for PPP in kinematic applications", Proceedings of the 31st International Technical Meeting of the Satellite Division of the Institute of Navigation (ION GNSS+ 2018) Sep. 24-28, 2018, Hyatt Regency Miami, Miami, Florida.

Karaim, Malek , et al., "GNSS Error Sources", https://www.intechopen.com/books/multifunctional-operation-and-application-of-gps/gnss-error-sources, published Apr. 6, 2018.

Khanafseh, Samer , et al., "GNSS Multipath Error Modeling for Automotive Applications", Abstract only, Proceedings of the 31st International Technical Meeting of the Satellite Division of the Institute of Navigation (ION GNSS+ 2018), Miami, Florida, Sep. 2018, pp. 1573-1589, https://www.ion.org/publications/abstract.cfm?articleID=16107.

Li, T. , et al., "Some remarks on GNSS integer ambiguity validation methods", Survey Review, Dec. 5, 2012, vol. 44, No. 326.

Pervan, Boris , et al., "Shaping Aviation Integrity Two RAIMs for Safety", GPS World the Business and Technology of Global Navigation and Positioning, Apr. 1, 2008.

Pullen, Sam , "Augmented GNSS: Fundamentals and Keys to Integrity and Continuity", Department of Aeronautics and Astronautics, Stanford University, Stanford, CA 94305-4035 USA, Tuesday, Sep. 20, 2011 1:30-5:00 PM Oregon Convention Center, Portland, Oregon.

Teunissen, P.J.G. , "GNSS Integer Ambiguity Validation: Overview of Theory and Methods", Proceedings of the ION 2013 Pacific PNT Meeting, Apr. 23-25, 2013, Marriott Waikiki Beach Resort & Spa, Honolulu, Hawaii, https://www.ion.org/publications/abstract.cfm?articleID=11030.

Teunissen, Peter J.G., et al., "Integer Aperture Estimation a Framework for GNSS Ambiguity Acceptance Testing", InsideGNSS, Mar./Apr. 2011, pp. 66-73, www.insidegnss.com.

Thombre, Sarang , et al., "GNSS great Monitoring and Reporting: Past, Present, and a Proposed Future", The Journal of Navigation, Dec. 2017, DOI: 10.1017/S0373463317000911, https://www.researchgate.net/publication/321663256.

Urquhart, Landon , et al., "Innovation: Integrity for safe navigation", https://www.gpsworld.com/innovation-integrity-for-safe-navigation-provided-by-gnss-service/, GPS World, Feb. 12, 2020.

Van Graas, Frank , et al., "Precise Velocity Estimation Using a Stand-Alone GPS Receiver", Abstract only, Journal of the Institute of Navigation, vol. 51, No. 4, Winter 2004-2005, pp. 283-292, https://www.ion.org/publications/abstract.cfm?articleID=102384.

Zhu, Ni , et al., "GNSS Position Integrity in Urban Environments: A Review of Literature", IEEE Transactions on Intelligent Transportation Systems, 2018, 17p., 10.1109/TITS.2017.2766768.hal-01709519.

(56) References Cited

OTHER PUBLICATIONS

Lei, Yu, et al., "Prediction of Navigation Satellite Clock Bias by Gaussian Process Regression", Lecture Notes in Electrical Engineering 342:411-423, Jan. 2015.

Odijk, Dennis, et al., "On the estimability of parameters in undifferenced, uncombined GNSS network and PPP-RTK user models by means of S-system theory", Journal of Geodesy, Nov. 2015.

Peng, Hao, et al., "Covariance Fusion Strategy of Gaussian Processes Covariance and Orbital Prediction Uncertainty", Conference: AAS/AIAA Astrodynamics Specialist Conference, Portland, ME, Aug. 2019.

Snelson, Edward, et al., "Sparse Gaussian Process using Pseudo-inputs", NIPS'05: Proceedings of the 18th International Conference on Neural Information Processing Systems, Dec. 2005, pp. 1257-1264.

Titsias, Michael K., "Variational Learning of Inducing Variables in Sparse Gaussian Processes", http://proceedings.mlr.press/v5/titsias09a/titsias09a.pdf.

"Geo++ SSR For Network-RTK, PPP and PPP-RTK", https://geopp.de/wp-content/uploads/2020/09/SSR_Flyer_v3.pdf.

"IGS State Space Representation (SSR) Format Version 1.00", International GNSS Service (IGS), Oct. 5, 2020.

"Safe Position Augmentation for Real-Time Navigation (SPARTN) Interface Control Document Version 1.8.0", Jan. 2020, Sapcorda Services GmbH.

Altmayer, Christian, "Cycle Slip Detection and Correction by Means of Integrated Systems", ION Institute of Navigation, Proceedings of the 200 National Technical Meeting of the Institute of Navigation, Abstract, Jan. 26-28, 2000.

Blanch, Juan, et al., "RAIM with Optimal Integrity and Continuity Allocations Under Multiple Failures", IEEE Transactions on Aerospace and Electronic Systems, vol. 46, No. 3, Jul. 2010.

Cassel, Ryan, "Real-Time ARAIM Using GPS, GLONASS, and GALILEO", Submitted in partial fulfillment of the requirements for the degree of Master of Science in Mechanical and Aerospace Engineering in the Graduate College of the Illinois Institute of Technology, May 2017.

Feng, Shaun, et al., "Carrier phase-based integrity monitoring for high-accuracy positioning", GPS Solution, Apr. 2009.

Hirokawa, Dr. Rui, "Recent Activity of International Standardization for High-Accuracy GNSS Correction Service", Mitsubishi Electric, Jun. 27, 2019.

Kissai, Ali, et al., "UAV Dead Reckoning with and without using INS/ GPS Integrated System in GPS denied Polar Region", International Journal of Aeronautics and Aerospace Engineering, ISSN: 2643-8224, 10 pages.

Kuusniemi, Heidi, et al., "GNSS Signal Reliability Testing in Urban and Indoor Environments", Proceedings of NTM 2004 Conference (Session A2), San Diego, CA, Jan. 26-28, 2004, The Institute of Navigation.

Lee, Jae Ho, et al., "A Two-antenna GPS Receiver Integrated with Dead Reckoning Sensors", ION Institute of Navigation, Proceedings of the IAIN Work Congress and the 56th Annual Meeting of the Institute of Navigation, Jun. 26-28, 2000, 4 pages.

Liu, Haiying, et al., "A closed-loop EKF and multi-failure diagnosis approach for cooperative GNSS positioning", Engineering, GPS Solutions, Published 2015.

Madrid, Navarro, et al., "New Approach for Integrity Bounds Computation Applied to Advanced Precise Positioning Applications", Proceedings of the 28th International Technical Meeting of the Satellite Division of The Institute of Navigation (ION GNSS+ 2015) Sep. 14-18, 2015, Tampa Convention Center, Tampa, Florida.

Phelts, R. Eric, et al., "Innovation: Improving ARAIM, An approach using precise point positioning", GPS World, Jun. 13, 2020, https://www.gpsworld.com/innovation-improving-araim/.

Schmitz, Martin, "RTCM State Space Representation Messages, Status and Plans", PPP-RTK & Open Standards Symposium, Mar. 12-13, 2012, Frankfurt, Germany.

Subirana, J. Sanz, et al., "Carrier Phase Cycle-Slip Detection—Navipedia", https://gssc.esa.int/navipedia/index.php/Carrier_Phase_Cycle-Slip_Detection, published 2011.

Takasu, Tomoji, et al., "ION GNSS 2008 abstract submission Cycle slip detection and fixing by MEMS IMU/GPS Integration for mobile environment RTK-GPS", Tokyo University of Marine Science and Technology, ION GNSS 2008, abstract submission.

Van Diggelen, Frank, et al., "Google to improve urban GPS accuracy for apps", Dec. 9, 2020, Android Developers Blog.

Waserman, Eyal, et al., "A Mixed Integer Least-Squares Formulation of the GNSS Snapshot Positioning Problem", https://github.com/eyalw711/snapshot-positioning, Jun. 2, 2021.

Yang, Wenhao, et al., "An Improved Relative GNSS Tracking Method Utilizing Single Frequency Receivers", Sensors 2020, 20, 4073; doi:10 3390/s20154073 www.mdpi.com/journal/sensors, 19 pages.

* cited by examiner

SYSTEM AND METHOD FOR GAUSSIAN PROCESS ENHANCED GNSS CORRECTIONS GENERATION

CROSS-REFERENCE TO RELATED APPLICATIONS

This application claims the benefit of U.S. Provisional Application No. 62/881,520 filed 1 Aug. 2019, each of which is incorporated in its entirety by this reference.

TECHNICAL FIELD

This invention relates generally to the satellite positioning field, and more specifically to a new and useful system and method in the satellite positioning field.

BACKGROUND

Being able to perform high precision satellite positioning is important for a wide variety of applications. Unfortunately, current GNSS solutions are often either inaccurate or require processor power beyond the capabilities of inexpensive hardware (either locally or in the cloud). A number of solutions have been proposed to address this problem, including Network Real Time Kinematic (Network RTK) satellite positioning. Unfortunately, in traditional methods of Network RTK, the input parameter space increases non-linearly with the size of the network, making it very computationally costly to increase the network size (and thus coverage area and/or positioning accuracy). However, other models may suffer from issues relating to how model parameters are updated (typically via Kalman filter or least-squares). Therefore, there is the need in the satellite positioning field to create a new and useful system and method. This invention provides such new and useful system and method.

DESCRIPTION OF THE INVENTION EMBODIMENTS

The following description of the invention embodiments of the invention is not intended to limit the invention to these invention embodiments, but rather to enable any person skilled in the art to make and use this invention.

2.3 Overview

Figure 1:
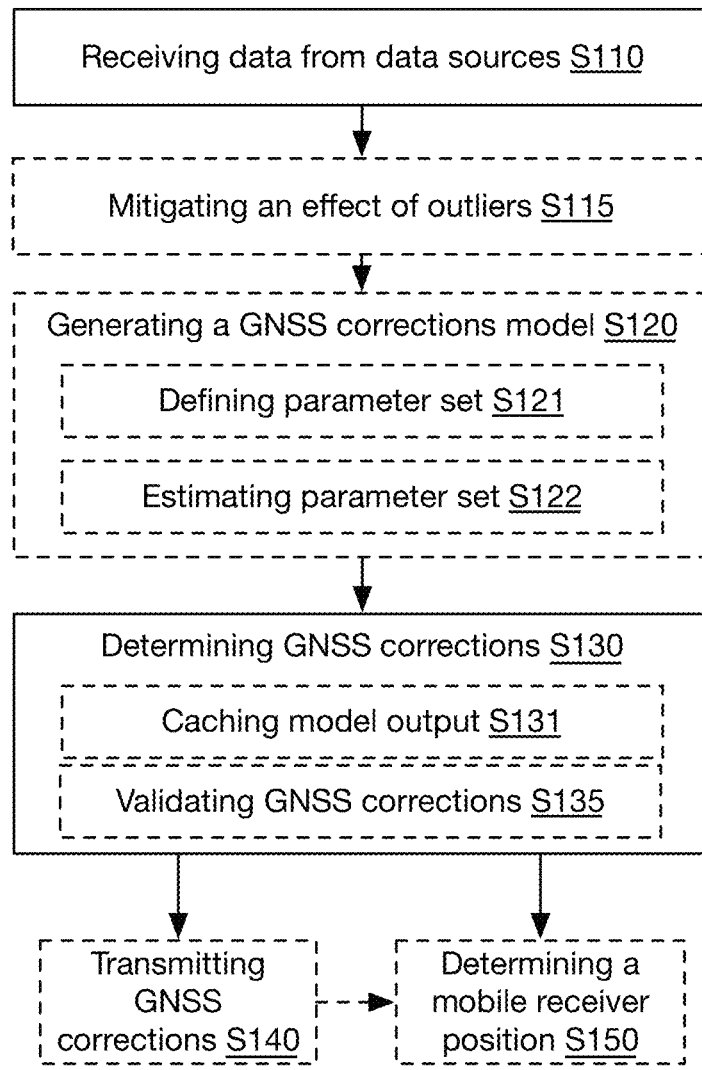
FIG. 1 is a chart representation of a method of an invention embodiment.

As shown in FIG. 1, a method for generating GNSS corrections can include: receiving data S110 and determining GNSS corrections S130. The method can optionally include: mitigating an effect of outliers in the data S115, determining a GNSS corrections model S120, transmitting the GNSS corrections S140, determining a mobile receiver position S150, and/or any suitable steps. The data preferably corresponds to a set of satellite observations (e.g., pseudorange, carrier phase, ephemeris, code data, etc.), corresponding to one or more satellites of one or more satellite constellations, detected at a set of reference stations, detected at other satellites (e.g., low earth orbit satellites), and/or detected at any suitable detection site. However, the data can additionally or alternatively include sensor data, weather conditions (e.g., temperature, humidity, wind, etc.), and/or any suitable data.

Figure 4:
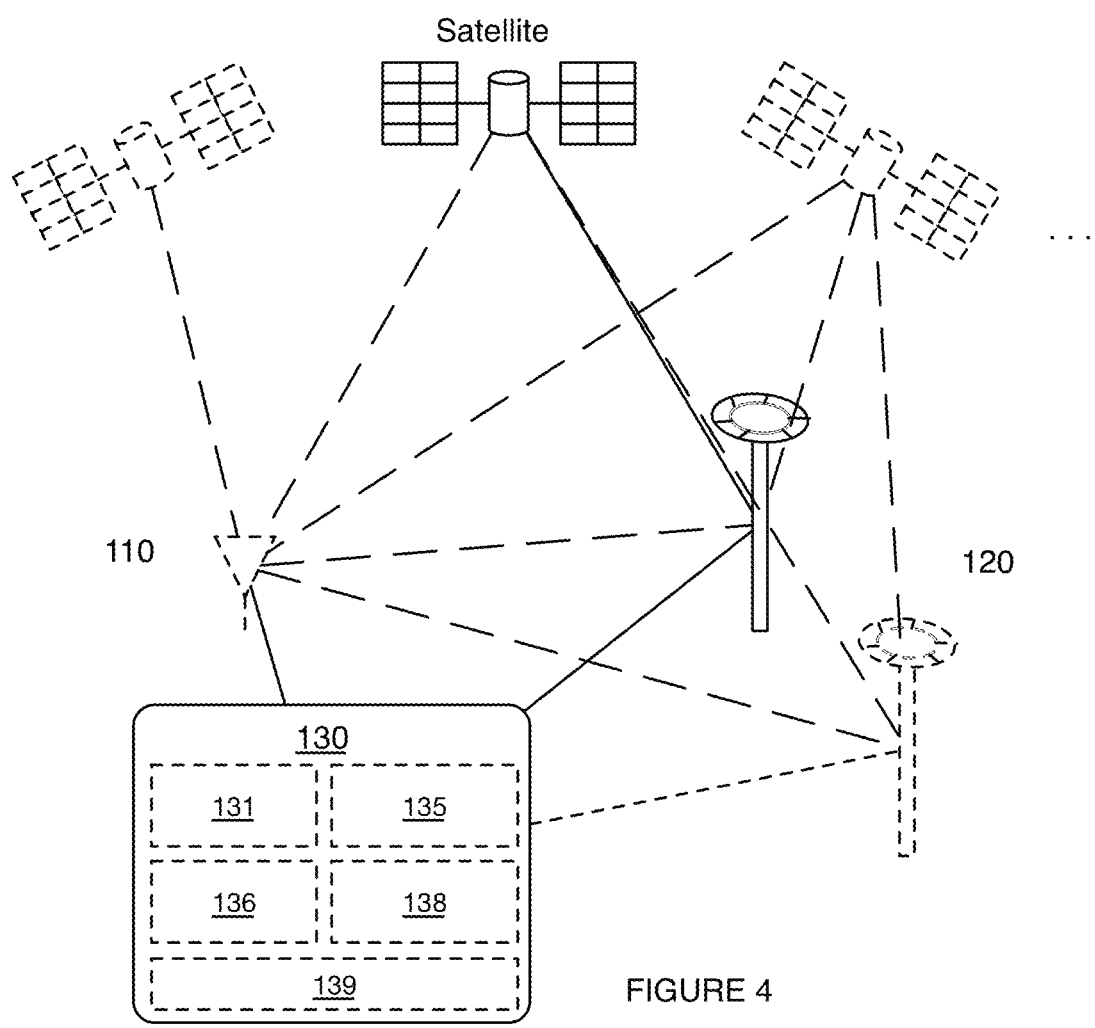
FIG. 4 is a schematic representation of an embodiment of the system.
Figure 5:
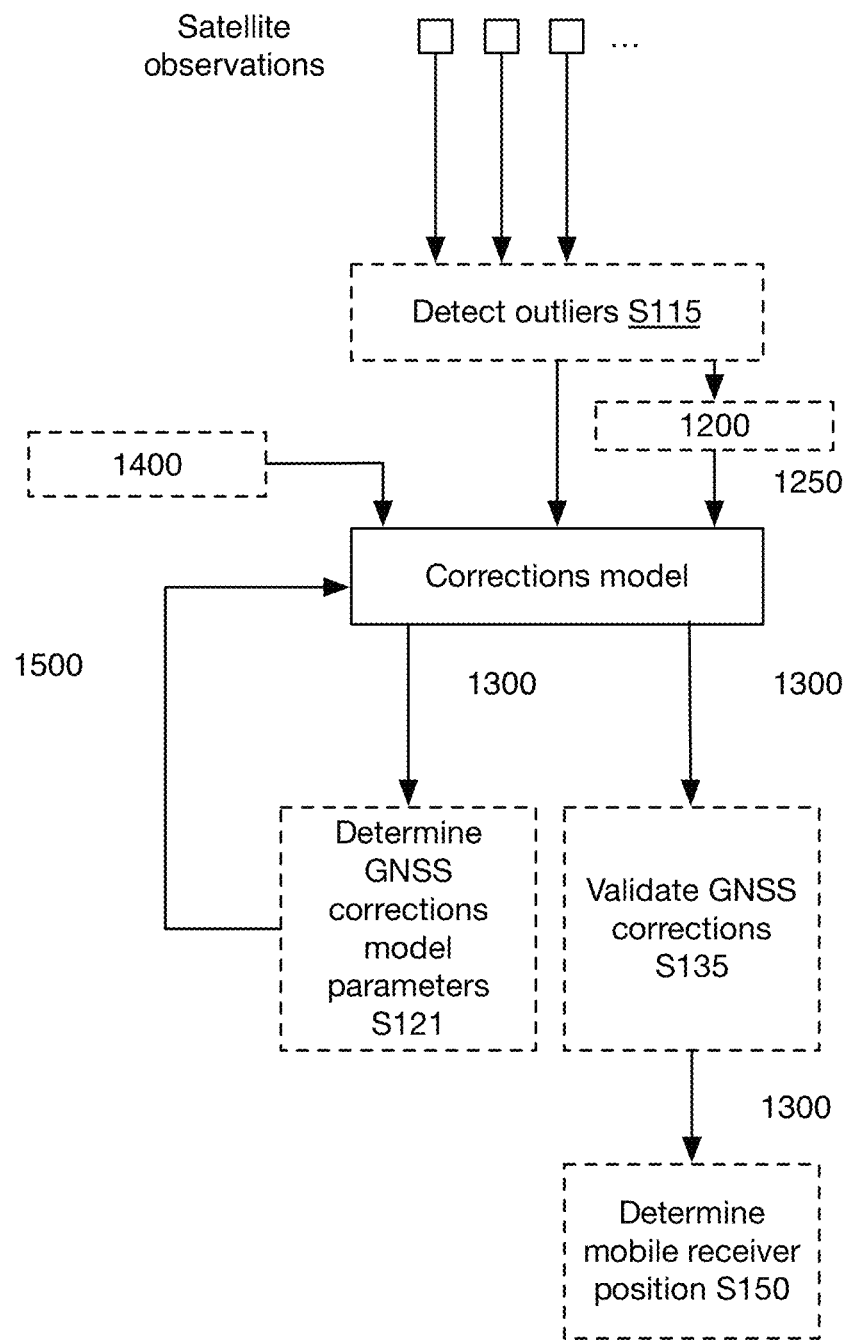
FIG. 5 is a schematic representation of an example of the method.

As shown in FIG. 4, a system for generating GNSS corrections can include: one or more mobile receivers, a set of reference stations, and a computing system. The system can optionally include sensors. The computing system can include: a corrections modeler 131, a validator 138, a querier 135, a stitcher 136, a corrections generator 137, and/or any suitable components.

The system and/or method preferably function to determine GNSS corrections, which can be used to correct satellite observations and/or mobile receiver positions to increase the accuracy and/or integrity of a mobile receiver position.

Embodiments of the system and/or method can be used, for example, in autonomous or semi-autonomous vehicle guidance (e.g., for unmanned aerial vehicles (UAVs), unmanned aerial systems (UAS), self-driving cars, agricultural equipment, robotics, rail transport/transit systems, autonomous trucking, last mile delivery, etc.), GPS/GNSS research, surveying systems, user devices, mobile applications, internet-of-things (TOT) devices, and/or may be used in any other suitable application. In specific examples, the system (and/or components) can be coupled to any suitable external system such as a vehicle (e.g., UAV, UAS, car, truck, etc.), robot, railcar, user device (e.g., cell phone), and/or any suitable system, and can provide positioning data, integrity data (e.g., protection level data), and/or other data to said system.

In a specific example, the system and/or method can include receiving a set of satellite observations corresponding to one or more satellites associated with one or more satellite constellation; generating a set of GNSS corrections using a GNSS corrections model, wherein the GNSS corrections model comprises a Gaussian process, wherein inputs to the GNSS corrections model comprise undifferenced and uncombined satellite observations from the set of satellite observations; wherein the set of GNSS corrections are operable to correct a position estimate for a mobile receiver.

1.2 Traditional GNSS, PPP, and RTK

Traditional satellite positioning systems (e.g., standard GNSS) work by attempting to align a local copy (at a receiver) of a pseudorandom binary sequence with a satellite-transmitted copy of the same sequence; because the satellite is far from the receiver, the signal transmitted by the satellite is delayed. By delaying the local copy of the sequence to match up with the satellite-transmitted copy, the time it takes the signal to travel from the satellite to the receiver can be found, which can in turn be used to calculate the distance between the satellite and receiver. By performing this process for multiple satellites (typically four or more), a position of the receiver relative to the satellites can be found, which can in turn be used to find the position in a particular geographic coordinate system (e.g., latitude, longitude, and elevation). Typical GNSS systems can achieve at best 2 m accuracy in positioning.

For many applications (e.g., guidance for human-carrying autonomous vehicles/drones/agricultural equipment, GPS/GNSS research, surveying), this level of accuracy is woefully inadequate. In response, two position correction algorithms have been developed: precise point positioning (PPP) and real time kinematic (RTK).

Instead of solely using the positioning code broadcast by satellites, PPP and RTK also make use of satellite signal carrier phase to determine the position. While much higher accuracy is possible using carrier phase data, accurately determining the position of a mobile receiver (e.g., the receiver for which position is to be calculated) requires accounting for a number of potential sources of error. Further, carrier phase measurements are ambiguous; because the carrier signal is uniform, it may not be possible to differentiate between a phase shift of $\varphi$ and $2\pi N+\varphi$ using phase measurements alone, where N is an integer. For example, it may be difficult to determine the difference between a phase shift of $\pi$ radians and a phase shift of $3\pi$ radians (or $-\pi$, $5\pi$, etc.).

PPP attempts to solve this issue by explicitly modeling the error present in mobile receiver phase and code measurements. Some errors are global or nearly global (e.g., satellite orbit and clock errors); for these errors, PPP typically uses correction data with highly accurate measurements. However, for local errors (e.g., error that are substantially dependent on mobile receiver location), PPP is only capable of very rough modeling. Fortunately, many local errors change slowly in time; resultantly, PPP can achieve high accuracy with only a single receiver, but may require a long convergence time to precisely determine local errors. As the terms are used in the present application, "global error" refers to any error that does not vary substantially across multiple reference stations within a region, while "local error" refers to error that does vary substantially across multiple reference stations (because the error is specific to a reference station and/or because the error varies substantially over position within the region). As this error pertains to positioning, such errors may also be referred to as "global positioning error" and "local positioning error".

RTK avoids a large majority of the modeling present in PPP by use of GNSS reference stations (with precisely known locations); since a reference station is local to the mobile receiver, differencing the reference station and mobile receiver signals can result in greatly reduced error. The result is that RTK solutions can converge much more quickly than PPP solutions (and without the high accuracy global corrections data needed by PPP). However, RTK solutions require the presence of base stations near a mobile receiver.

Recently, correction generations systems have been developed that navigate the tradeoffs of PPP and RTK, such as the system of U.S. patent application Ser. No. 16/195,427, the entirety of which is incorporated by this reference.

In such systems, flexibility in the form of corrections data is an inherent and distinguishing aspect over traditional position correction systems. Rather than attempting to generate corrections solely from a small set of high-quality global reference stations (as in PPP) or by comparing data in mobile receiver/reference station pairs (as in RTK), such systems collect data from reference stations (and/or other data sources), and instead of (or in addition to) applying this data directly to generate connections, the data is used to generate correction models. Output of these models are then passed to a correction generator, which can use said output to generate correction data in any form. Further, the correction generator may cache and/or spatially interpolate corrections data to provide high quality corrections to mobile receivers regardless of correction capability (e.g., whether the receiver can process RTK/PPP corrections) and location of individual base stations.

By operating in this manner, such systems may provide a set of corrections that (while usable with PPP receivers) suffers from little of PPP's long convergence time issues, with solution complexity scaling directly with the number of reference stations N (unlike RTK, in which solution complexity scales at least with the number of possible pairs; i.e., $N^2$. In fact, many current solutions scale with $N^3$ or worse). Further, since corrections are preferably calculated using local correction models that may depend on any number of single reference stations (rather than specific reference station pairs), corrections are substantially more robust to loss of a base station.

Further, the flexible nature of the such systems enables some functions (such as spatial interpolation and caching) to be performed much more generally than would be possible with RTK; while the concept of a "virtual reference station" is known within RTK (also referred to as a "pseudo reference station"), virtual reference stations typically involve the interpolation of RTK corrections data in real time (and, as discussed before, error correction scales in complexity with $N^2$). In contrast, interpolation in such systems can be limited to specific aspects of global and/or local corrections models, providing more robustness to error and better insight as to error causes. Further, unlike RTK, which requires real-time corrections data, model-based systems may cache or otherwise retain model parameters even when data is limited (e.g., when a reference station suddenly becomes unavailable).

In such a model-based system, it is of course necessary to update models with time (as the effects that affect GNSS positioning are themselves time-variant). Traditionally, models may be updated using a Kalman filter.

A Kalman Filter can be used to estimate the state of a system at time index k ($x_k$—generally referred to as a state vector) by relating x to an observation vector z at time index k as well as to the state vector at the previous time index ($x_{k-1}$) as follows:

$$z_k = H_k x_k + v_k$$

$$x_k = \Phi_{k-1} x_{k-1} + w_{k-1}$$

where $v_k$ is observation noise (zero mean and with known covariance), $H_k$ is the observation model that maps the true state space into the observed space, $w_{k-1}$ is process noise (also zero mean and with known covariance) and $\Phi_{k-1}$ is the transition model that maps true state at time k−1 to true state at time k. In the case of updating a positioning corrections generation model, the state vector may contain parameters of the model (and the observation vector includes the data used to estimate those parameters—for example, pseudo-range, phase, and position data of reference stations).

An example of a state vector is as follows: $x_k = [p_x, p_y, p_z, dt, b_f^P, b_f^L, N_f^s]$ where $p_x, p_y, p_z$ represent position estimates in cartesian form, dt represent station clock error, b represents bias per frequency (both for pseudorange P and carrier phase L), and $N_f^s$ represents ambiguities (for each frequency f and satellite-device pair s). The state vector may additionally or alternatively contain terms for ionosphere, troposphere, satellite clock and bias terms, and other dynamics (e.g., velocity, acceleration, angular velocity, etc.).

However, the inventors have discovered that Kalman filters, when used to model undifferenced and uncombined networks, can have a number of drawbacks. For example, since the Kalman filter updates the state vector at each time step, if some parameters change on very different timescales than others (e.g., clock biases may change more often than ionospheric delays), the Kalman filter may become (erroneously) overly biased toward past results for the slowly changing parameters. Further, the Kalman filter may have issues in modeling parameters that are constant in time (e.g., integer phase ambiguity) as the filter generally requires non-zero process noise to operate correctly. Another issue is that Kalman filters generally require keeping track of the state of a model; this becomes problematic when dealing with spatial fields (because it would likely require keeping track of a grid of values for the field, greatly increasing the size of the problem).

The system and method of this application are directed to novel techniques implementing Gaussian processes to update positioning corrections generation models. Such techniques may be used to more accurately model GNSS corrections parameters, which may in turn result in more accurate satellite positioning for mobile receivers utilizing said corrections. Gaussian processes may provide a number of advantages over Kalman filters in some implementations of GNSS corrections generations. For example, Gaussian processes may, via the "kernel trick" (note that this is a term of art), bypass direct computation of a model's state, allowing for reduced computational complexity in many implementations compared to a Kalman filter approach.

1.3 Differences Between Gaussian Processes and Kalman Filters

The key differentiator between something like Least Squares or a Kalman Filter and Gaussian Process is the use of a kernel (or covariance) function, $k(x_i, x_j)=\text{cov}[y_i, y_j]$, which encodes the relationship between all observations where $y_i$ and $y_j$ are observations (typically pseudorange or carrier phase) corresponding to two locations (or features) given by $x_i$ and $x_j$. This kernel function is used to place a multivariate Gaussian prior, $f(x)N(0, K_{yy})$, on the function values, $f(x)$, which could produce the observations, y, where $f(x)$ is a vector of the function values at the training locations $[f(x_0), \ldots, f(x_n)]$ and the matrix $K_{yy}$ has elements $[K_{yy}]_{ij}=k(x_i,x_j)$. We can then use this framework to make predictions for some new locations $x_*$ by asking for the distribution of functions at the prediction locations conditional on the observations, $[f(x_*)|f(x)=y] \sim N(K_{*y}K_{yy}^{-1}y, K_{**}-K_{*y}K_{yy}^{-1}K_{y*})$.

Unlike Kalman Filters, Gaussian processes do not require a state vector and in turn do not require a process or observation model. Further, all observations may be taken into account simultaneously. Instead of defining process and observation models, a Gaussian process is defined by specifying a covariance function which typically (though not always) describes how any two observations, $z_i$ and $z_j$, relate to each other.

One of the advantages to utilizing the Gaussian process is that, by choosing a parameter set across time, the time variance of various parameters can be modeled at explicitly set timescales. While a Kalman filter will provide the state of some parameter at time step k based on priors and a set of update data, the Gaussian process can be used to model the state of the same parameter at multiple time steps simultaneously.

So, for example, if a Kalman filter includes both an ionospheric delay term (which can change relatively slowly) and a clock error term (which can change more rapidly), the Kalman filter must be run at a rate appropriate to capture changes in the clock error term. This rate may be both unnecessarily high to model the ionospheric delay term and may result in the ionospheric delay model becoming biased toward initial inputs.

In contrast, the Gaussian process could explicitly model the set of parameters across time. For example, if data is available for timesteps from 0 to k, the Gaussian process could fit parameters for $\epsilon_c$ (clock error) at each time step $\{\epsilon_{c0}, \epsilon_{c1}, \ldots, \epsilon_{ck-1}, \epsilon_{ck}\}$ and ionospheric delay I at a subset of time steps (e.g., $\{I_0, I_{00}, \ldots I_{k-100}, I_k\}$. Furthermore, Gaussian processes do not necessarily include a Markov assumption, which allows a Gaussian process to model smooth processes (e.g., smooth errors) better than a Kalman filter, implicitly capture strong correlations between errors, and/or improve outlier detection and integrity Relatedly, Gaussian processes may be used to explicitly model a parameter as time invariant, whereas Kalman filters require some amount of process noise (typically, for a time invariant parameter, Kalman filters are configured with very small but non-zero process noise).

Note that in modeling Gaussian processes, the covariance between parameters is typically specified. So, for example, for a set of three parameters, nine covariance terms are needed (including identity terms—note that some of these terms may be identical).

2. System

The system preferably uses a set of data collected by one or more data sources 121. Data sources can include: mobile receivers, sensors (e.g., located onboard the receiver, the external system, the reference stations, etc.), databases, satellites, reference stations, and/or any other suitable data source. Examples of data that can be used include: satellite observations, sensor observations, and/or any other suitable data.

The mobile receiver 110 preferably functions to receive a set of satellite observations (e.g., satellite signals such as carrier phase and satellite code) from one or more satellites. In variants, the mobile receiver can determine the location of the mobile receiver (and/or external system) based on the satellite observations. The mobile receiver is preferably in communication with the computing system. However, the mobile receiver can be integrated with the computing system, and/or the mobile receiver and computing system can be arranged in any suitable manner. The mobile receiver is preferably a stand-alone device (e.g., a GNSS receiver, antenna). However, the mobile receiver can be integrated into an external system (e.g., be a component of an automobile, aero vehicle, nautical vehicle, mobile device, a satellite, etc.), can be a user device (e.g., smart phone, laptop, cell phone, smart watch, etc.), and/or can be configured in any suitable manner.

The set of satellite observations 125 can include orbital data (e.g., ephemeris), timestamp, code data, carrier phase data, pseudocode data, and/or any suitable data. The set of satellite observations preferably includes satellite observations corresponding to satellites from a plurality of satellite constellations (e.g., Global Positioning System (GPS), GLObal Navigation Satellite System (GLONASS), BeiDou navigation satellite System (BDS), Galileo, etc.). However, the set of satellite observations can correspond to satellites from a single satellite constellation, can include data from an augmentation system (e.g., Satellite Based Augmentation System (SBAS) such as Wide Area Augmentation System (WAAS), European Geostationary Navigation Overlay Service (EGNOS), Multi-Functional Satellite Augmentation System (MSAS), Omnistar, StarFire, etc.; Ground Based Augmentation Systems (GBAS) such as Local Area Augmentation System (LAAS); etc.), and/or can include any suitable data.

In variants of the system including more than one mobile receiver, each mobile receiver can be configured to receive satellite observations corresponding to a satellite constellation, to a carrier frequency (e.g., the L1, L2, L5, E1, E5a, E5b, E5ab, E6, G1, G2, G3, B1, B2, B3, LEX, etc. frequencies), and/or corresponding to any suitable source.

The reference station(s) 121 preferably function to receive a set of satellite observations (e.g., reference station satellite observations) and transmit the reference station satellite observations to the computing system (and/or to the mobile receiver). The satellite observations from the reference station(s) can be used to determine corrections (e.g., local and/or global corrections such as to account for atmospheric effects, to account for clock errors, etc.) to the set of satellite observations. Each reference station is preferably communicably coupled to the computing system. However, the reference station can include the computing system and/or be coupled to the computing system in any suitable manner. The reference stations can be in communication with the mobile receiver. The reference stations are preferably public reference stations, but can additionally or alternatively be private reference stations or any other suitable reference stations. The reference station(s) are preferably located within about 500 km of the mobile receivers, but the distance between the reference stations and the mobile receiver can be any distance.

The reference station satellite observations can correspond to the same and/or a different set of satellites as the set of satellite observations received by the mobile receiver. However, the reference station satellite observations can correspond to any suitable satellite observations.

The location (e.g., position) of the reference station(s) is preferably known to a high degree of accuracy (e.g., less than 1 mm, 1 cm, 1 dm, 1 m, etc. of uncertainty in the location of the reference station). The location of the reference station(s) can be static and/or dynamic. Reference station location is preferably the location of the antenna used to receive satellite signals, however, the reference station location can be any suitable location. Reference station location can be determined, for example, by using a predetermined number of receivers arranged around the reference station at vertical and horizontal reference points. Note that while reference stations are preferably fixed in location, they may additionally or alternatively be mobile. Station position is preferably re-determined to high accuracy before moved reference stations re-start providing data. However, additionally or alternatively, reference stations may provide data before location re-determination (for example, for use in attitude estimation; alternatively, data may be provided but not used). As another alternative, reference stations may not provide absolute location data; for example, absolute location data of the reference station may not be needed for applications including attitude estimation. Note that fixed reference stations may, over time, "self-survey" their own positions to a reasonably high degree of accuracy.

Reference stations preferably provide data for multiple satellite signals and the location of the reference station via the internet, but can additionally or alternatively provide data by any other suitable method (e.g., transmission by UHF-band radio modem). Reference station data is preferably made available directly to the method, but may additionally or alternatively be processed or aggregated before being made available to the method 100.

Reference stations preferably have one or more satellite receivers and generate corrections based on those receivers. The number and quality of satellite receivers used by a reference station (or other factors, like antenna type/size/location) may determine the accuracy of reference station data. Reference stations (or other sources of reference station data; e.g., a reference source that creates correction data from multiple reference stations) may be ordered or grouped by reference station quality (e.g., accuracy of corrections) and/or locality (e.g., if corrections are desired for a particular mobile receiver, reference stations may be ordered or grouped by distance to that receiver). The reference station satellite receivers can be the same as and/or different from the satellite receivers of the mobile receiver.

The computing system 130 preferably functions to process the data (e.g., satellite observations) from the data sources (e.g., receiver, reference stations, etc.). The computing system can: aggregate the data (e.g., combine the receiver satellite observations, reference station satellite observations, and sensor data; reorganize the receiver satellite observations, reference station satellite observations, and sensor data such as based on the time stamp, time of transmission, time of receipt, etc.; etc.), filter the data (e.g., to calculate state vectors, ambiguities such as phase ambiguities, etc. associated with the data), calculate the receiver position (e.g., based on ambiguities), correct the data (e.g., correct the satellite observations for clock errors, hardware bias, atmospheric effects, cycle slips, etc.), generate corrections (e.g., global corrections, atmospheric corrections, etc.), and/or can process the data in any suitable manner. The computing system can be local (e.g., on-board the external system, integrated in a receiver, integrated with a reference station, etc.), remote (e.g., cloud computing, server, networked, etc.), and/or distributed (e.g., between a remote and local computing system).

The GNSS corrections 1300 are preferably used to correct one or more satellite observations. The GNSS corrections can correspond to individual satellites, sets of satellites, satellite constellations, satellite frequencies, every satellite, reference stations, and/or to any data source. For example, the GNSS corrections can be used to correct the satellite observations for atmospheric effects (e.g., ionosphere delays, troposphere delays, ionosphere gradients, etc.), global effects (e.g., hardware biases, orbit errors, clock errors, etc.), local effect (e.g., receiver hardware bias, receiver clock errors, multipath, integer ambiguities, etc.), and/or any effects. The GNSS corrections can correspond to RTK corrections, PPP corrections, PPP-RTK corrections, SBAS corrections, and/or any suitable corrections. The GNSS corrections can be updated (e.g., at a predetermined time such as based on the type of correction, the intended application, the external system, the target receiver position accuracy, target receiver position integrity, etc.) and/or fixed. The GNSS corrections can be updated at predetermined times (e.g., 1 s, 5 s, 10 s, 30 s, 60 s, 2 min, 5 min, 10 min, 20 min, 30 min, 60 min, 2 hr, 4 hr, 8 hr, 12 hr, 24 hr, etc.), responsive to a trigger (e.g., change in weather, change in temperature, change in mobile receiver position, change in satellites in view of the receiver, etc.), manually (e.g., responsive to a user request for updated corrections), and/or with any suitable timing. The GNSS corrections can be associated with a validity period, wherein the GNSS corrections can be invalid outside of the validity period (e.g., and must be refreshed), or permanently valid.

In variants, the GNSS corrections can be generated in batches. The batches can correspond to temporal batches (e.g., a set of satellite observations received within a predetermined time), spatial batches (e.g., all satellite observations received within a predetermined area such as at a single reference station, at a cluster of reference stations, etc.), and/or any suitable batches. Each batch preferably includes at least 1,000 satellite observations (and/or other data sets) such as about 3,000; 5,000; 7,500; 10,000; 15,000; 20,000; 25,000; 30,000; 35,000; 50,000; 100,000; 150,000; 200,000; 250,000; 500,000; 1,000,000; 1,000-1,000,000 satellite observations, etc. However, each batch can include less than 1,000 satellite observations or more than 1,000,000 satellite observations. Each new batch is preferably used to update the GNSS corrections. However, each batch can be used to generate a different GNSS correction, generate a new GNSS correction (e.g., independent of prior GNSS corrections), and/or can be otherwise used.

However, the GNSS corrections can be generated continuously (e.g., as additional satellite observations are observed, they are included in the model, as they are requested, etc.) and/or in any manner.

The GNSS corrections are preferably determined using a Gaussian process. However, one or more GNSS correction of the GNSS correction set can be generated using particle filters (e.g., Kalman filter, extended Kalman filters, etc.), using models, as disclosed in U.S. patent application Ser. No. 16/589,932 titled 'SYSTEMS AND METHODS FOR DISTRIBUTED DENSE NETWORK PROCESSING OF SATELLITE POSITIONING DATA' filed 1 Oct. 2019, herein incorporated in its entirety by this reference, and/or in any manner. In an embodiment, the GNSS corrections can be generated without using a Kalman filter. However, one or more GNSS correction of the GNSS corrections set can be generated using a Kalman filter and/or in any manner.

The computing system is preferably communicably coupled to the mobile receiver(s) and to the reference station(s), but the computing system can be in communication with any suitable components.

In variants, the computing system can include a corrections modeler 131, a querier 135, a stitcher 136, a corrections generator 137, a validator 138, and/or any suitable modules or components. In specific examples, the system can include one or more components as described in U.S. application Ser. No. 16/817,196 filed 12 Mar. 2020, U.S. application Ser. No. 16/865,077 filed 1 May 2020, and/or U.S. application Ser. No. 16/589,932 filed 1 Oct. 2019, each of which is incorporated herein its entirety by this reference, or otherwise configured.

The GNSS corrections modeler 131 preferably functions to determine the GNSS corrections (and/or the metadata). The system can include one or more corrections modelers 131 (e.g., different modelers for different errors, different modelers for the same error, the same modeler for multiple errors, etc.). The correction modeler preferably determines the GNSS corrections using the reference station satellite observations, but can additionally or alternatively determine the GNSS corrections based on errors and/or delays estimated using PPP filters (e.g., ionosphere delays, troposphere delays, etc.) and/or based on any data. The correction modeler preferably determines the GNSS corrections using undifferenced and/or uncombined GNSS corrections. However, the correction modeler can additionally or alternatively determine the GNSS corrections using single differenced (e.g., between satellite observations received at the mobile receiver, between satellite observations received at the mobile receiver and a satellite observations received at a reference station, etc.), double differenced (e.g., between satellite observations received at the mobile receiver and the reference station, between satellite observations received at the mobile receiver and different reference stations), triple differenced (e.g., between satellite observations received during a first epoch at the mobile receiver and the reference station and satellite observations received during a second epoch at the mobile receiver and the reference station), and/or otherwise combined or differenced satellite observations.

Each correction model is preferably valid for a predetermined geographic extent (e.g., associated with the respective error; be predetermined, determined based on the geographic extent of the inputs, etc.), but can additionally or alternatively be valid for the entire globe, a timeframe, and/or any other suitable set of parameters. The corrections modeler can output the corrections model (e.g., the covariance matrix, a list of features, an information vector, etc.), a component of the corrections model, and/or any other suitable information. The models can be serialized, batched, or otherwise output. The models can optionally be compressed (e.g., by predicting the zenith ionosphere mean and variance at a series of grid points per thin shell model and using the predicted values instead).

The correction model that the correction modeler uses to determine the GNSS corrections is preferably a Gaussian process and/or a sparse Gaussian process. However, one or more corrections can be generated using machine learning, using a particle filter (e.g., a Kalman filter, an extended Kalman filter, etc.), and/or otherwise generate the GNSS corrections.

The GNSS corrections modeler can include a validator 138, which functions to validate the GNSS corrections. The GNSS corrections can be validated for a predetermined amount of time (e.g., where the GNSS corrections need to be updated after that time) and/or can be indefinitely validated. The GNSS corrections can be validated based on a validation dataset (e.g., a dataset that was withheld from the set of satellite observations used to generate the GNSS corrections, a subset of the data that was used to generate the GNSS corrections, a set of satellite observations associated with one or more reference station such as a validation reference station or master reference station, etc.), a validation model, a residual (or estimated residual) of the receiver position, a comparison of GNSS corrections generated by two or more different models, and/or the GNSS corrections can be otherwise validated.

In examples, the GNSS corrections modeler can include a global corrections modeler 132, a local corrections modeler 133, an interpolator 134, an atmospheric modeler 139, and/or any component disclosed in and/or can determine and/or validate the GNSS corrections as disclosed in U.S. patent application Ser. No. 16/589,932 titled 'SYSTEMS AND METHODS FOR DISTRIBUTED DENSE NETWORK PROCESSING OF SATELLITE POSITIONING DATA' filed 1 Oct. 2019, and as disclosed in U.S. patent application Ser. No. 16/865,077 titled 'SYSTEMS AND METHODS FOR HIGH-INTEGRITY SATELLITE POSITIONING' filed 1 May 2020, each of which is incorporated herein in its entirety by this reference.

The querier 135 preferably functions to store (e.g., cache) GNSS corrections and to process requests for GNSS corrections (e.g., from mobile receivers or reference stations). The querier can store (e.g., cache) the most recent GNSS corrections, a buffer of GNSS corrections, all GNSS corrections (e.g., all GNSS corrections generated, all GNSS corrections generated within a predetermined amount of time, etc.), and/or any suitable GNSS corrections. Additionally or alternatively, the querier 135 can store a buffer of correction models, and uses the stored models to respond to receiver requests. For example, the querier 135 can return predicted ionosphere delays, clock corrections, and/or other corrections determined based on the request parameters (e.g., including the receiver's rough position) and stored correction models.

Examples of requests can include requests for GNSS corrections, requests for particular error sources, paths between a receiver and a data source, and/or any suitable request. In an illustrative example such as for an atmospheric effect, a querier request might look like a set of paths from a receiver (e.g., mobile receiver, reference station receiver, etc.) to several satellites and the response would be the predicted atmospheric delays along those paths.

The stitcher 136 is preferably, but not exclusively, included in variants of the system that process batches of satellite observations to generate the GNSS corrections. The stitcher preferably functions to connect and/or combine the GNSS corrections associated with different batches. Additionally or alternatively, the stitcher can function to prevent discontinuities (e.g., jumps) between GNSS correction updates (e.g., associated with different batches of GNSS observations), constrain discontinuities to be smaller than a threshold (e.g., duration, magnitude, location, etc.), decrease the number of discontinuities, decrease the frequency of discontinuities, and/or other modify the GNSS corrections particularly between updates. Additionally or alternatively, the stitcher 136 can store a buffer of correction models, and generates a larger model (e.g., larger Gaussian process, combination of correction models, etc.) that combines the results from the stored model. The correction models within the buffer are preferably for the same error and extend across multiple timeframes; however, the correction models can be for multiple errors, and extend across the same or different timeframes. In variants including a stitcher, the corrections can be directly output by the stitcher to the receivers, the stitcher-produced models can be provided to the querier 135 for storage and use, or the stitcher-produced models can be otherwise used.

Additionally or alternatively, the stitcher can connect and/or combine the GNSS corrections based on constraints, patchwork kriging, and/or other methods. The GNSS corrections can be constrained and/or connected based on data or corrections associated with an individual reference station (e.g., a 'master reference station'), an individual satellite (e.g., 'a master satellite'), an average reference station (e.g., an average of a plurality of reference stations), a satellite constellation, a plurality of satellites, and/or any suitable data source. In an illustrative example, the stitcher can ensure that a bias estimate associated with a master reference station remains constant between batches and/or GNSS correction updates.

The stitcher 136 can additionally or alternatively function to validate (or cross validate) GNSS corrections, such as relative to a previous GNSS correction. The updated corrections can be compared to the immediately prior GNSS corrections, an average prior GNSS correction (e.g., corresponding to one or more batches), and/or to any suitable corrections. When the GNSS corrections associated with one batch differ by less than or equal to a threshold from another batch, they can be cross validated. When the GNSS corrections associated with one batch differ by greater than a threshold from GNSS correction associated with another batch, the more recent batch can be excluded, the GNSS corrections model can be run again, the older batch can be excluded, outlier detection can be repeated, a flag or warning can be output (e.g., indicative of an unvalidated batch or GNSS correction, of an estimated accuracy of a receiver position using the GNSS corrections, of an estimated integrity of. the receiver position using the GNSS corrections, etc.), and/or the stitcher can otherwise function. However, the GNSS corrections can be cross validated when the difference between GNSS corrections associated with a first batch and a second batch exceeds a threshold and/or can be otherwise cross validated.

The correction generator preferably functions to produce a receiver-specific model of the GNSS corrections (e.g., specific to a reference station receiver, mobile receiver, etc.) for each of a set of receivers. This receiver-specific model can then be used (e.g., by the querier, by the receiver) to determine the receiver-specific corrections. The receiver specific model is preferably generated by querying the GNSS corrections model (e.g., via the querier/stitcher), but can be otherwise generated. The receiver specific model is preferably generated by querying the GNSS corrections model at some points and building a new Gaussian process with an empirical covariance which is chosen to ensure the resulting receiver model will produce substantially the same prediction (e.g., differing from the full corrections model by at most 1%, 2%, 5%, 10%, 20%, 25%, etc.) for the same points. The receiver-specific model can be updated: when a new corrections model is determined by the corrections modeler; in response to occurrence of a redetermination event (e.g., integrity risk exceeds a predetermined threshold, etc.); and/or at any other suitable time. However, the receiver specific model can be additionally or alternatively generated.

The positioning module 139 preferably functions to determine the receiver position using the GNSS corrections. The positioning module 139 is preferably located on the receiver side (e.g., remote from the corrections modeler, querier, stitcher, remote processing system, etc.), but can alternatively be part of the remote processing system or otherwise arranged. The receiver position is preferably determined to a high accuracy (e.g., less than about 1 mm, 5 mm, 1 cm, 2 cm, 5 cm, 1 dm, 2 dm, 5 dm, 1 m, 2 m, 5 m, etc.) and/or to a high integrity (e.g., total integrity risk $<10^{-4}$, $<10^{-5}$, $<10^{-6}$, $<10^{-7}$, $<10^{-8}$, $<10^{-9}$, $<10^{-10}$/hr, etc.); however, the receiver position can be determined to any accuracy and/or integrity. In examples, the position module can calculate the receiver position and/or otherwise operate as a 'position module' as disclosed in U.S. patent application Ser. No. 16/865,077 titled 'Systems and Methods for High-Integrity Satellite Positioning' filed 1 May 2020. However, the positioning module can be otherwise configured.

3. Method

The method preferably functions to determine GNSS corrections and/or estimate (e.g., calculate, determine) the position of the mobile receiver using the GNSS corrections. Steps and/or substeps of the method can be performed iteratively (e.g., for different epochs, for the same epoch, etc.), sequentially, and/or in any suitable order. The steps and/or substeps of the method can be performed in series and/or in parallel. The steps and/or substeps are preferably performed by a system as described above, but can be performed by any system.

Silo includes receiving data from a set of data sources. The data sources preferably correspond to reference stations, but can additionally or alternatively include computing systems (e.g., databases, PPP global corrections data sources, etc.) and/or any suitable data sources. The data preferably corresponds to raw (e.g., unprocessed) data, but can additionally or alternatively include processed data. The data preferably corresponds to undifferenced and/or uncombined satellite observations (e.g., as measured at a reference station), but can additionally or alternatively include difference satellite observations, atmospheric delays (e.g., as estimated or determined using a PPP filter), calibration data (e.g., associated with satellites and/or receivers), satellite orbit data, and/or any suitable data.

In some embodiments of the method, the data can be associated with a batch (e.g., set) of data. The data can be batched based on the time of receipt (and/or storage, processing, etc.); a time window during which the data is received (and/or stored, processed, etc.); a location that the data is associated with (e.g., a location of a reference station); and/or be otherwise batched. Each batch of data preferably includes at least 1000 data points (e.g., satellite observations), but can include less than about 1000 data points and/or any number of data points.

S115 includes detecting one or more outliers in the data set, which functions to determine whether one or more outliers are present in the data. The outliers can be detected as data is received, before the data is processed, after a batch of data has been received, and/or with any timing. The outliers can be detected within a batch of data, from all data that is received, and/or within any set of data. The outliers are preferably detected using a RANSAC method, but can additionally or alternatively be detected using a MLESAC method, a MAPSAC method, KALMANSAC method, resampling, and/or be detected in any manner.

When one or more outliers are detected, the effects of the outliers can be mitigated. Examples of mitigating the effects of the outliers include: removing the outliers from the dataset, weighting the data (e.g., with a weight that depends on the probability that the data is an outlier and/or inlier), acquiring additional data, and/or otherwise mitigating the impact of outliers.

In some embodiments, one or more outliers can be detected and/or mitigated as disclosed in U.S. patent application Ser. No. 16/748,517 titled "SYSTEMS AND METHODS FOR REDUCED-OUTLIER SATELLITE POSITIONING" filed 21 Jan. 2020, which is herein incorporated in its entirety by this reference. However, the outlier(s) can be detected in any manner.

S120 includes generating a GNSS correction model, which functions to determine a GNSS corrections model to use to generate the GNSS corrections, to set parameters and/or hyperparameters of the GNSS correction model (e.g., in response to data received from reference stations), and/or otherwise generate a GNSS corrections model. The GNSS correction model is preferably generated by a correction modeler (e.g., of the computing system), but can be generated by any component.

Figure 2:
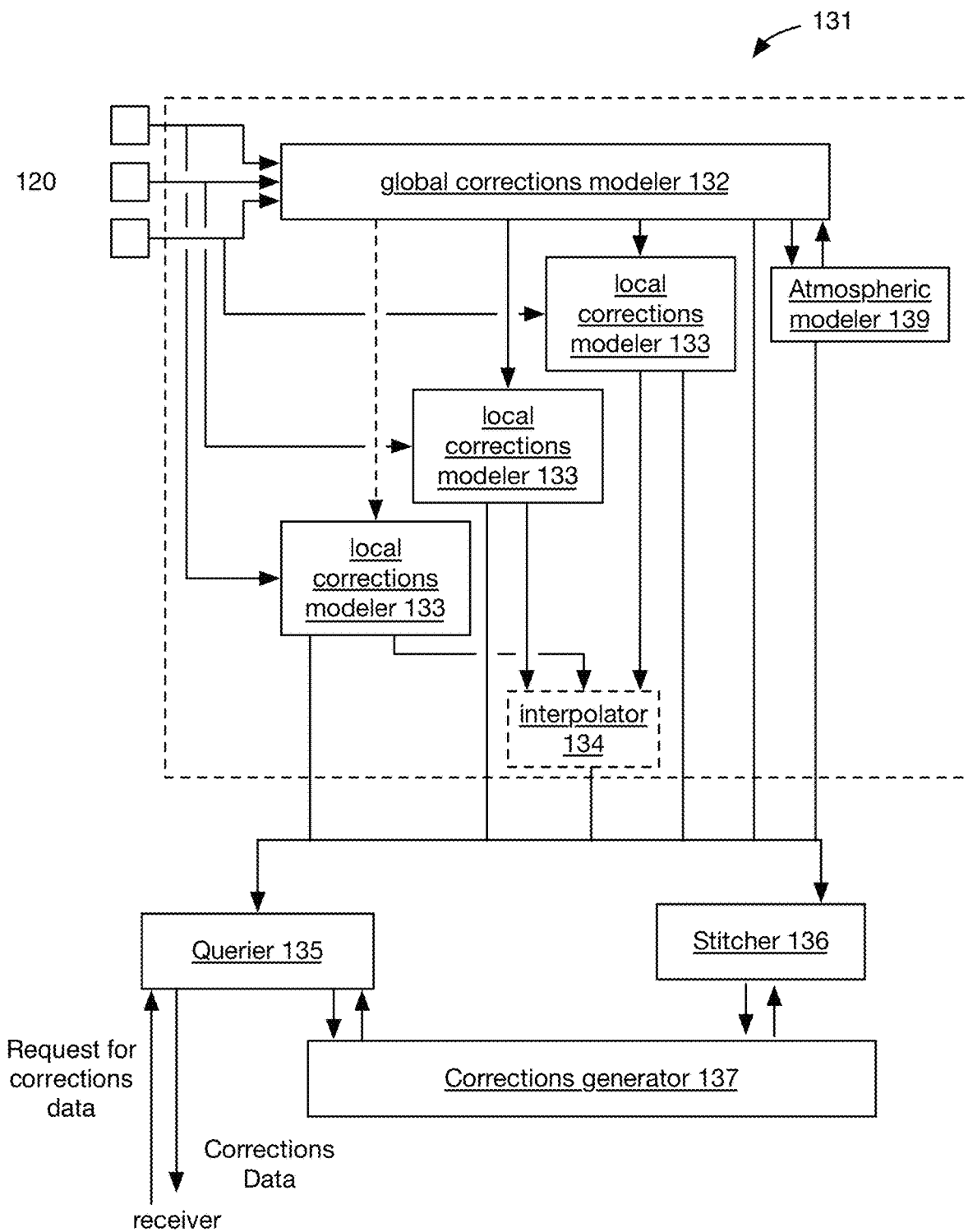
FIG. 2 is a schematic representation of an example of a computing system for determining GNSS corrections.

GNSS corrections models can correct for any error source impacting the satellite observations. For example, as described in U.S. patent application Ser. No. 16/195,427 and as shown in FIG. 2, corrections models may be separated into global models (which model the effects of global and/or spatially invariant errors on GNSS signals) and local models (which model local and/or spatially variant effects on GNSS signals and/or effects that are specific to particular receivers/reference stations). Examples of global effects include satellite-specific effects (e.g., satellite clock error, satellite orbit error, satellite hardware bias, satellite antenna phase windup, phase center offset (PCO), phase center variation (PCV), etc.), satellite-independent effects (e.g., solid earth tides, solid earth pole tides, ocean tidal loading, etc.), and/or other effects. In variants, global effect can include atmospheric effects (e.g., ionospheric and/or tropospheric effects such as coarse estimates of atmospheric effects for example to be used for use initializing a later refinement of the atmospheric effects). Examples of local effects can include receiver-independent effects (e.g., atmospheric effects such as ionospheric effects such as ionosphere delay, ionosphere gradient, etc.; tropospheric effects such as troposphere delay; etc.), receiver-dependent effects (e.g., receiver clock error, receiver hardware bias, receiver antenna phase windup/PCO/PCV, carrier phase ambiguity, multi-path effects, etc.), and/or any local effects. Alternatively, corrections models can correct for any suitable error source(s).

The GNSS corrections model can generate the GNSS corrections in batches (e.g., piecewise such as once a predetermined amount of data is available) and/or continuously. The batches can correspond to temporal batches (e.g., using sets of data that are collected within a time window), spatial batches (e.g., using sets of data that are collected within a spatial area), satellite batches (e.g., generated for specific satellites or sets of satellites), satellite constellation batches, reference station batches (e.g., groups of independent reference stations), and/or any suitable batches.

The GNSS corrections model is preferably generated and/or updated using a Gaussian process. The same Gaussian process is preferably used to determine (e.g., estimate) the GNSS correction for each error source (e.g., each error source that is to be accounted for). However, a different Gaussian process can be utilized for subsets of error sources (e.g., a global effect Gaussian process, a local effect Gaussian process, error- or effect-specific Gaussian process(es), etc.), one or more effects and/or errors can be modelled (and/or estimated) using a particle filter (e.g., a Kalman filter), one or more effects and/or errors can be modelled (and/or estimated) using machine learning, and/or the effects and/or errors can be estimated in any manner. Here, "using a Gaussian process" preferably refers to fitting one or more Gaussian process models (which make up at least part of GNSS corrections model) based on the data set (e.g., reference station data). It is important to note that many parameter fitting techniques make assumptions based on Gaussian distributions (e.g., Kalman filters assume Gaussian noise). "Gaussian process" is a term of art (referring to a probability distribution over a set of possible functions) and not intended to refer to simply any parameter fitting technique that includes some aspect of Gaussian statistics. However, a Gaussian process can be otherwise defined.

In some variations, the GNSS correction model can include one or more sparse approximations to a Gaussian process. Using a sparse approximation to a Gaussian process can provide the benefit of decreasing the computational load which can be particularly beneficial when a large number of data inputs are used. Examples of sparse approximations that can be used include fully independent training conditional (FITC), partially independent training conditional (PITC), using a hierarchy (e.g., plurality) of inducing point layers, a variational free energy (VFE), informative vector machine (IVM), and/or any suitable sparse approximation to the Gaussian process.

Inputs to the correction model can include: undifferenced satellite observations, uncombined satellite observations, differenced satellite observations (e.g., singled differenced, double differenced, triple differenced, linear combinations, etc.), pierce points, atmospheric delays (e.g., ionosphere delays, troposphere delays, ionosphere gradient, higher order delays, etc. such as modelled using a PPP filter 1200), sensor data (e.g., receiver velocity, receiver vibration, etc.), inducing points, and/or any data or information.

In variants including inducing points, the inducing points can function to decrease the number of data inputs necessary for the GNSS corrections model, which can provide the benefit of increasing the computational efficiency and/or speed of the model. Each inducing point preferably corresponds to one or more variables (e.g., state, effects, errors, etc.) related to a data source where data observed by the data source is weakly correlated or uncorrelated with data from other data sources. However, inducing points can correspond to variables of a cluster of data sources (e.g., where the cluster of data sources are weakly or uncorrelated with other data sources and/or clusters of data sources) and/or to any data source. The variable can correspond to a subset of times (e.g., the time associated with a batch of satellite observations, a subset of times associated with a batch of satellite observations, times not associated with a batch of satellite observations, etc.), the entire time over which observations have been made, and/or any suitable time. In variants, the inducing points can include each variable associated with a data source. However, one or more variable associated with a data source can be excluded (e.g., to be accounted for by the Gaussian process), and/or the inducing points can include any suitable variable(s). In an illustrative example, atmospheric effects (e.g., ionosphere delay, ionosphere gradient, troposphere delay, etc.) can be excluded from the set of inducing points (e.g., to be accounted for implicitly by the Gaussian process). However, any variables can be included or excluded from the set of inducing points.

In specific examples, the inducing points can correspond to hardware bias for one or more reference station, clock errors for one or more reference station, atmospheric effects (e.g., ionosphere delay, troposphere delay, ionosphere gradient, etc.) associated with sets or clusters of reference stations, clock errors associated with one or more satellite, hardware bias errors associated with one or more satellite, orbital errors associated with one or more satellite, errors associated with one or more satellite constellations, hardware bias associated with a GNSS receiver, clock errors associated with a GNSS receiver, errors or effects associated with sensors, and/or any suitable effect or error associated with any data source(s).

In a first illustrative example, each inducing point can correspond to variables related to one or more reference stations of the set of reference stations.

In a second illustrative example, variables (e.g., observations; satellite states such as satellite orbit, satellite clocks, satellite biases, etc.) relating to each satellite (e.g., in-view satellite) can correspond to an inducing point. In a variant of the second example, each satellite constellation can correspond to an inducing point.

Outputs from the GNSS correction model can include: GNSS corrections (e.g., accounting for one or more effect and/or error), residuals in the GNSS corrections, confidence in the GNSS corrections (e.g., predicted accuracy and/or integrity of the determined mobile receiver position using the GNSS corrections, likelihood that the GNSS corrections are correct, etc.), carrier phase ambiguities (e.g., fixed integer ambiguities, float ambiguities, etc.), outliers (e.g., outliers in the input data), and/or any output.

Figure 3A:
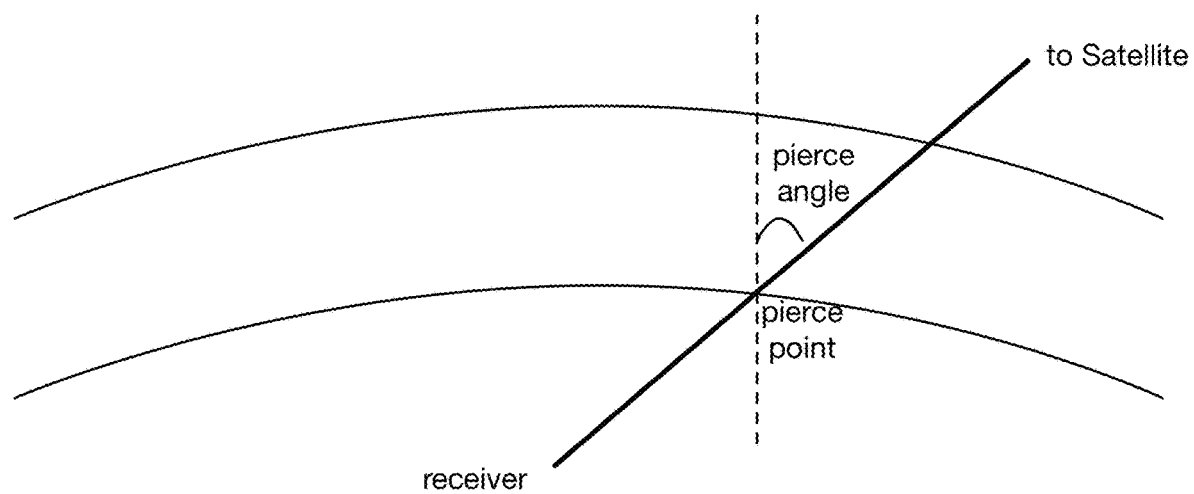
FIGS. 3A and 3B are example representations of atmospheric effect (e.g., ionospheric effect) model parameters.
Figure 3B:
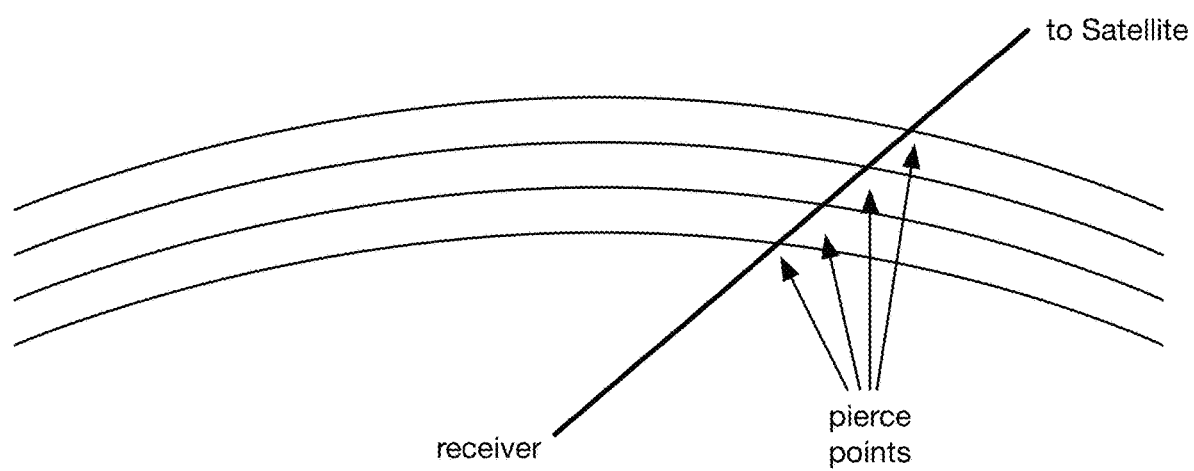

The Gaussian process is preferably associated with (e.g., depends on) a set of parameters. S121 can include determining the set of parameters. The parameters 1500 can be determined (e.g., calculated) in real or near real time, offline, and/or with any timing. The parameters can be determined automatically, semi-automatically, and/or manually. The parameters are preferably retrieved from memory, but can be determined in any manner. The parameters can be static, dynamic, variable, and/or otherwise defined. Examples of parameters can include: covariance function(s), a functional relationship between variables (e.g., a distance function, a time function, etc.), mapping functions, distance functions, pierce points, data inputs, atmospheric shells (e.g., shell thickness, number of shells, type of shell, etc.), hyperparameters, spatio-temporal scales (e.g., spatial, temporal, etc. length scales), and/or any suitable data and/or information. In an illustrative example, parameter covariances may be defined based on a model; e.g., the covariance between ionospheric delay at two positions (e.g., corresponding to two reference stations) may be modeled as a function of the distance between pierce points (where the line of sight between a receiver and a satellite intersects the atmospheric layer as shown in FIGS. 3A and 3B) and/or pierce angles.

A covariance function preferably defines a relationship (e.g., correlation) between two or more variables (such as inputs to the Gaussian process). In specific examples, the covariances can represent covariances between satellite observations at a reference station (e.g., per station covariances, per station bias, etc.), covariances between satellite observations from a single satellite (e.g., per satellite covariances, per satellite bias, etc.), covariances between satellite observations from a satellite constellation (e.g., per satellite constellation covariances), between satellite observations from different reference stations, covariances between satellite observations from different satellites, and/or between any satellite observations. The relationship can be a spatial correlation (e.g., how correlated the variables are in space), a temporal correlation (e.g., how correlated the variables are in time), a dependence (e.g., a model relating one input to another input), a kinematic correlation (e.g., a correlation in speed, acceleration, jerk, etc. of the variables), a frequency correlation (e.g., how correlated the variables are in frequency), a satellite correlation, a reference station correlation, a satellite constellation correlation, combinations thereof, and/or any suitable correlation. Two or more covariance functions can be combined through addition (and/or subtraction), multiplication (and/or division), exponentiation, convolution, and/or in any manner.

The covariance can depend on a difference between the inputs, a magnitude of the difference between the inputs, a parametric function (e.g., a processed input, a function of the inputs, etc.), the inputs independently, a product of the inputs, and/or have any dependence on the inputs.

In a first illustrative example, a covariance function can depend on a distance function, which determines a distance between two locations. Examples of distance functions include: Euclidean distance, great circle distance, geodesic distance, Chebyshev distance, Manhattan distance, Minkowski distance, and/or any distance metric or function. The distance function is preferably a radial basis function, but can include a spherical basis function, azimuthal basis function, altitude basis function, zenith basis function, and/or any basis functions.

In a second illustrative example, a covariance function can depend on (and/or include) a mapping function (e.g., m(p)), which functions to correct for the distance that a signal (e.g., satellite observation) spends in a spatial region. Examples of mapping functions include: obliquity (e.g., $m(p)=\sec(\theta_i)$ where $\theta_i$ is the angle that the signal intersects the shell relative to a reference axis such as an axis normal to a shell, normal to the surface of the earth, vertical axis, horizontal axis, etc.), Niell mapping functions, Isobaric mapping functions, Vienna mapping functions, Global mapping functions, hydrostatic mapping function, wet mapping function, and/or any suitable mapping function.

Examples of covariance functions include: constant functions, polynomial (e.g., linear, quadratic, piecewise smooth polynomials, etc.) functions, white noise functions, Kronecker delta (or Dirac delta function) functions, squared exponential functions, Ornstein-Uhlenbeck (e.g., Brownian) functions, (e.g., with variable drift terms that are dependent on the current value of the process), Weiner functions, Matérn functions, Bessel functions, periodic functions, rational (e.g., rational quadratic) functions, y-exponential functions, neural network covariance functions, and/or any suitable covariance function.

The covariance function can lead to isotropic (e.g., covariance function depends on the magnitude of a difference between the inputs) and/or anisotropic (e.g., covariance function does not depend on the magnitude of a difference between the inputs) Gaussian processes.

The covariance function can lead to a stationary and/or nonstationary Gaussian process. The covariance function can lead to a periodic or aperiodic Gaussian process.

The covariance function can lead to a smooth, mostly smooth (e.g., at least 60% of the Gaussian process accounted for by a covariance function that leads to a smooth Gaussian process), partially smooth (e.g., between about 40-60% of the Gaussian process accounted for by a covariance function that leads to a smooth Gaussian process), mostly not smooth (e.g., at most 40% of the Gaussian process accounted for by a covariance function that leads to a smooth Gaussian process), and/or not smooth (e.g., jittery) Gaussian process.

Each covariance function is preferably associated with one or more hyperparameters, which function to describe a correlation strength (e.g., correlation amplitude), a variance, a memory, a decorrelation scale (e.g., length scale, duration, etc. over which the inputs decorrelate by a threshold value such as to 50%, 40%, 33%, 30%, 25%, 20%, 15%, 10%, 5%, 2.5%, 2%, 1%, 0.5%, 0.1%, etc.; 1/e, $1/e^2$, $1/e^3$, etc.; etc. relative to the maximum correlation strength), and/or otherwise characterize the correlation and/or covariance function.

In a first specific example, a covariance function for a satellite and/or receiver (e.g., reference stations, mobile receiver, etc.) error (such as a hardware bias, clock error, orbit error) can be an Ornstein-Uhlenbeck function such as:

$$c_{error}(z_i,z_j)=\sigma_{error}^2 e^{-\alpha_{error}|t_i-t_j|}$$

Where $z_i$ and $z_j$ are two observations corresponding to times $t_i$ and $t_j$ respectively, and $\sigma_{error}^2$ and $\alpha_{error}$ are hyperparameters which represent the total variance explained by the station clock and the time scale which indicates how much "memory" the station clock has or how quickly it de-correlates respectively.

In a second specific example, a covariance function for a satellite and/or receiver (e.g., reference stations, mobile receiver, etc.) error (such as a hardware bias, clock error, orbit error) can be a squared exponential function such as:

$$c_{error}(z_i,z_j)=\sigma_{error}^2 e^{-\alpha_{error}(t_i-t_j)^2}$$

In a third specific example, a covariance function for a satellite and/or receiver (e.g., reference stations, mobile receiver, etc.) error (such as a hardware bias, clock error, orbit error) can be a sum of an Ornstein-Uhlenbeck function and a squared exponential function such as:

$$c_{error}(z_i,z_j)=(\sigma_{error,ORN}^2 e^{-\alpha_{error,ORN}|t_i-t_j|}+\sigma_{error,GAU}^2 e^{-\alpha_{error,GAU}(t_i-t_j)^2})$$

Where the relative magnitudes of the hyper parameters $\sigma_{error,GAU}^2$ and $\sigma_{error,ORN}^2$ can be related to the relative contribution of the processes to the error, where $\sigma_{error,GAU}^2+\sigma_{error,ORN}^2=\sigma_{error}^2$, and where $\alpha_{error,ORN}$ and $\alpha_{error,GAU}$ can have any relation. However, $\sigma_{error,GAU}^2$ and $\sigma_{error,ORN}^2$ can be related in any manner.

In a fourth specific example, a position covariance function can be a polynomial covariance function such as:

$$c_{pos}(z_i,z_j)=\sigma_{pos}^2 u_i^T u_j$$

Where $u_i$ is the unit vector pointing from the receiver to the satellite observed by observation $z_i$.

In a fifth specific example, a covariance function can include a term such as:

$$c_{error}(z_i,z_j)=\text{IsSameFreq}(z_i,z_j)$$

$$c_{error}(z_i,z_j)=\text{IsSameType}(z_i,z_j)$$

Or $c_{error}(z_i,z_j)=\text{IsSameSource}(z_i,z_j)$ where IsSameX(zi,zj) returns 1 if true and 0 if false, where Freq refers to the carrier frequency corresponding to the satellite observation (e.g., the L1, L2, L5, E1, E5a, E5b, E5ab, E6, G1, G2, G3, B1, B2, B3, LEX, etc. frequencies), Type refers to the type of satellite observation (e.g., pseudorange, carrier phase, code, etc.), and Source refers to the data source (e.g., reference station, mobile receiver, satellite, satellite constellation, etc.).

In a sixth specific example, an atmospheric covariance function (e.g., an ionosphere or troposphere covariance function) can be a squared gaussian function such as:

$$c_{atm}(p_i,p_j)=\sigma_{atm}^2 e^{-\alpha_{atm}d(p_i,p_j)^2}$$

Figure 3C:
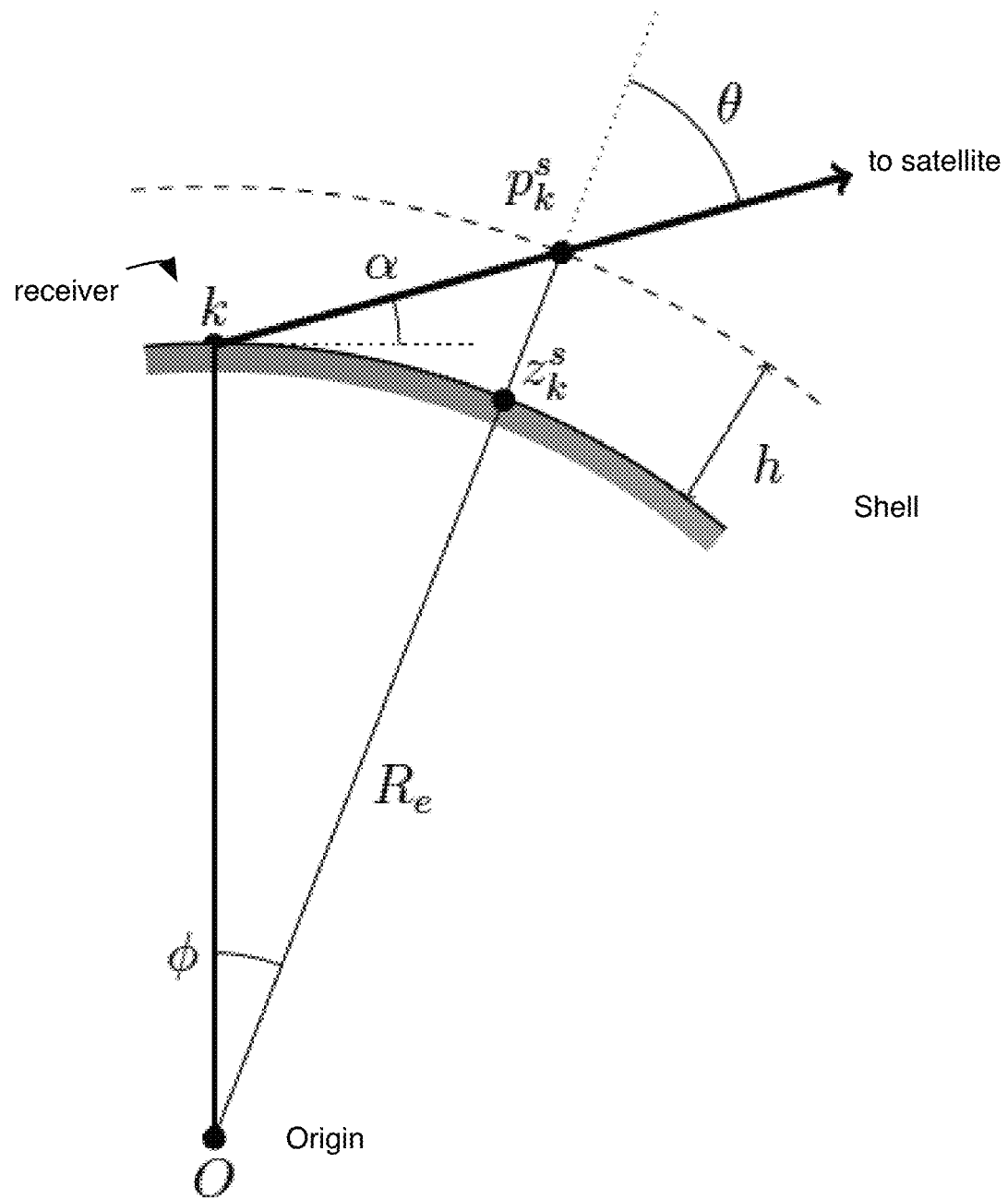
FIG. 3C is a schematic representation of an example of a coordinate system used in embodiments of an atmospheric effects model, where the origin can refer to the center of the earth or any suitable reference point.

Or $c_{vert}(p_i,p_j)=\sigma_{vert}^2 e^{-\alpha_{vert}h(p_i,p_j)^2}$

Where $p_i$ and $p_j$ correspond to two pierce points (for example as shown in FIGS. 3A, 3B, and 3C), $d(p_i,p_j)$ corresponds to a distance function between the two pierce points, and h(pi,pj) corresponds to a height difference between the two pierce points.

In a seventh specific example, an atmospheric covariance function (e.g., an ionosphere or troposphere covariance function) can be an Ornstein-Uhlenbeck function such as:

$$c_{atm}(p_k^s,p_{k'}^{s'})=\sigma_{atm}^2 e^{-\alpha_{atm}|p_k^s-p_{k'}^{s'}|}$$

In an eighth specific example, an atmospheric covariance function (e.g., an ionosphere or troposphere covariance function) can be a product of a mapping function (e.g., m(x)) and a covariance function such as:

$$c_{shell}(p_k^s p_{k'}^{s'})=m(p_k^s)*c_{atm}(p_k^s p_{k'}^{s'})*m(p_{k'}^{s'})$$

where $c_{atm}(p_k^s p_{k'}^{s'})$ can represent the correlation between the electron content at two different points in space. $m(p_k^s)$ can represent the obliquity ($m(p_i^s)=1/\cos(\theta_i)$, where $\theta_i$ is the angle at which a signal intersects the shell (e.g., relative to vertical), and/or be any other suitable mapping function.

In a ninth specific example, an atmospheric covariance function can be a convolution of covariance functions such as:

$$c_{atm\_multiple}(I_{1,k}^{s}, I_{1,k}^{s'}) = \Sigma_i^m \Sigma_j^m c_{vert}(p_{k,i}^s, p_{k,j}^{s'}) * c_{shell}(p_{k,i}^s, p_{k,j}^s)$$

Where $I_{1,k}^s$ corresponds to the ionosphere delay 1250.

In a tenth specific example, an atmospheric covariance functions can be an Ornstein-Uhlenbeck function such as:

$$c_{atm}(p_k^s, p_{k'}^{s'}) = \sigma_{atm}^2 e^{-\frac{|p_k^s - p_{k'}^{s'}|}{l_{atm}}}$$

Where $l_{atm}$ is a hyperparameter corresponding to a length scale for the decorrelation of the pierce points. In this specific example, a mean of the covariance function can be given by:

$$\mu(p_k^s) = a_{atm} + I_{k,model}^s$$

Where $\mu$ corresponds to the mean, $a_{atm}$ corresponds to an inferred atmospheric offset, and $I_{k,model}^s$ corresponds to the value that a model (e.g., the klobuchar model of the ionosphere, klobuchar model, NeQuick model, BeiDou global broadcast ionospheric delay correction model [BDGIM], etc.) would give for the zenith ionosphere delay at location $p_k^s$.

In an eleventh specific example, the atmospheric model includes a Gaussian process that uses covariances that model: a per-satellite bias (e.g., even with high-precision clock/orbit products), a multi-shell model (e.g., multiple shells for all satellites, one shell per satellite, etc.), and the great circle distance. However, the atmospheric model can be otherwise modelled.

In a twelfth specific example, the covariance function can be a sum, product, convolution, and/or otherwise combine any or all of the covariance functions from the preceding examples (e.g., a sum of the $c_{atm\_multiple}$, $c_{station}$, $c_{satellite}$). However, any covariance function can be used for any models and/or error(s).

In variants, the atmospheric model can include and/or correspond to a multi-shell model. The multi-shell model can refer to a plurality of shells, a shell associated with each satellite, a shell associated with each satellite constellation, and/or any suitable shells. Each shell of the multi-shell model can have the same or different thickness. However, the atmospheric model can include a single shell, model the atmosphere continuously, and/or otherwise model the atmosphere.

S121 may additionally or alternatively include modifying such models (or changing models) for covariance dynamically based on input data. For example, S121 may include a preprocessing step that determines how active the atmosphere (e.g., ionosphere, troposphere) is and adjusts model hyperparameters based on the activity. More generally, S121 may include tuning model parameters, covariance terms, and/or hyperparameters in any manner.

S121 may include selecting not only the parameters to be modeled but also the times at which these parameters should be modeled (and may include multiple time steps per parameter).

S121 may additionally include setting constraints. For example, S121 may include constraining the Gaussian process such that the mean variation of ionospheric delay and hardware bias (for a given receiver/satellite pair) is zero. Other useful constraints may include setting the mean of satellite clocks to zero (or some other value), stitching multiple models together (e.g., via enforcing boundary constraints at transition times between models, such as performed by a stitcher, etc.), setting a mean of the atmospheric model to the mean that generated by the an atmospheric model (e.g., $\mu(p_k^s) = a_{atm} + I_{k,model}^s$, where the model can be the klobuchar model, NeQuick model, BeiDou global broadcast ionospheric delay correction model [BDGIM], etc.), and/or applying any constraints to the parameters and/or hyperparametrers.

S120 can include determining the parameters and/or hyperparameters associated with the GNSS corrections model S122. S122 functions to determine the values of the parameters and/or hyperparameters used by the GNSS corrections generation model based on the reference data input. S122 can use reference data (e.g., a subset of the dataset, a separate reference dataset, a dataset that partially overlaps the data set, etc.), past parameter estimates (raw estimates, smoothed estimates, posterior state values, etc.), and/or any suitable data to determine GNSS correction model parameters.

The parameters and/or hyperparameters are preferably selected based on a quality metric. The quality metric can be a residual, a correction likelihood, an out-of-sample error, a root mean squared error, and/or other metric. The quality metric is preferably associated with a tuning dataset (e.g., test dataset, training dataset, etc.), which can be the same as the dataset used to generate the GNSS corrections, a subset of the GNSS corrections, and/or a different dataset from the dataset used to generate the GNSS corrections. The parameters and/or hyperparameters can be selected when the quality metric is less than a threshold, greater than a threshold, and/or equal to a threshold. In a specific example, the parameters and/or hyperparameters can be selected based on optimizing (e.g., minimizing, maximizing) the quality metric. However, the parameters and/or hyperparameters can be otherwise selected.

In some variants, a plurality of quality metrics can be determined. The plurality of quality metrics can correspond to the same or different tuning datasets. Each quality metric can correspond to the same set of parameters and/or hyperparameters or to a different set of parameters and/or hyperparameters. In these variants, the correction model can be selected based on a predetermined quality metric, an extremum (e.g., minimum, maximum, etc.) quality metric, an average quality metric, based on a weighted quality metric, using voting, and/or otherwise be selected based on the quality metric.

In a specific example, the correction model (and/or parameters or hyperparameters thereof) can be determined by withholding one or more data sources (e.g., withhold data associated with one or more reference station, sensor, satellite, satellite constellation, etc.), predicting the GNSS corrections for the withheld data source using the remaining data sources and the GNSS corrections model, determining a quality metric based on using the GNSS corrections for the withheld data source(s), and/or otherwise determined. This specific example can optionally include removing a mean from the withheld data sources to correct for a bias of the data source before and/or while determining the quality metric. The quality metric can be the RMSE, a log likelihood of errors, and/or any suitable quality metric. This specific example can be repeated for a plurality of withheld data sources, for a plurality of correction models (and/or parameters or hyperparameters thereof), and/or be otherwise repeated for selecting the correction model. The parameters, hyperparameters, and/or corrections model can then be selected as the values that have the highest likelihood of being correct, that have the lowest residual, the smallest root mean square error, that most accurately predict the GNSS corrections for each data source, and/or be otherwise selected.

In a related example, the GNSS corrections can be determined using data collected from the data sources during a first duration (e.g., $t_0$ to $t_1$) and the quality metric can be determined based on data collected from the data sources for a second duration (e.g., $t_0$ to $t_2$, $t_0$ to $t_b$, $t_1$ to $t_2$, etc.). In variants of this example, the GNSS corrections can be valid during and/or used during the first duration, the second duration, and/or for any suitable time duration.

For example, a set of parameters is calculated on a first set of reference data. Later, as new data is available, S122 may include recalculating the parameter set based on some combination of the new and old data (perhaps not including any of the old data); however, S122 may additionally or alternatively include updating one or more parameters from the initial set using the new data.

However, the correction model can be otherwise selected.

S130 includes generating a set of GNSS corrections. S130 functions to generate a set of GNSS corrections using the GNSS corrections model parameters S120. These corrections are preferably generated in a form usable by the receiver for which corrections are desired, but can additionally or alternatively be generated in any form. For example, when the receiver can accept PPP corrections, S130 can generate corrections in the form of PPP corrections (though, in contrast to true PPP corrections, the GNSS corrections generated by S130 may depend upon receiver position estimate or another spatial term). Additionally or alternatively, S130 may send corrections in the form of RTK corrections (e.g., of a virtual reference station), RTK-PPP corrections, SBAS corrections, and/or in any other form (e.g., local coefficients that are part of a local model, global coefficients that are part of a global model, etc.). Note that local and global corrections may happen in any order (and may be synchronous or asynchronous).

S130 may include dynamically adjusting the models used to generate GNSS corrections in any manner. For example, S130 may include switching between models at any time based on changing conditions.

S130 may additionally include caching model output S131 (and generating corrections using cached model output). Accordingly, in some embodiments, cached data can be used in addition to or instead of real-time data. Additionally or alternatively, new parameters may be estimated based on a predicted variation in time (e.g., predicted from cached values), or S130 may not rely on cached and/or predicted outputs.

S130 may also include calculating not only GNSS corrections but also uncertainty estimates for these corrections (e.g., based on uncertainty in input parameters).

In variants, S130 can include fixing the carrier phase ambiguity associated with one or more satellites in line-of-view of the receiver to an integer value. The carrier phase ambiguity can be fixed as part of the GNSS corrections model, as disclosed in U.S. patent application Ser. No. 16/817,196 titled "SYSTEMS AND METHODS FOR REAL TIME KINEMATIC SATELLITE POSITIONING," filed 12 Mar. 2020 or U.S. patent application Ser. No. 16/865,077 titled 'Systems and Methods for High-Integrity Satellite Positioning' filed 1 May 2020 each of which is incorporated herein in its entirety by this reference, and/or can be otherwise fixed or constrained.

In some variants, determining the GNSS corrections can include updating the data to include new data, new batches of data, new inducing points, and/or otherwise incorporate new groups of data. The new data is preferably not correlated with the existing data, but can be correlated with the existing data. In a specific example, updating the GNSS corrections model can include computing $\Lambda_b^{1/2}$, computing (or updating) a QR decomposition $\hat{Q}\hat{R}\hat{P}^T [R_a p_a^T \Lambda_b^{-1/2} K_{bu}]$, and setting $\hat{v} = \hat{P}\hat{R}^{-1} \hat{Q}^T [R_a P_a^T v_a \Lambda_b^{-1/2} y_b]$; where $y_a$ corresponds to a first set of observations (e.g., existing data), $y_b$ corresponds to new data, $\Lambda_f$ is a diagonal or block diagonal matrix corresponding to a difference between $K_{ff}$ (e.g., covariance function) and $Q_{ff}$ (e.g., variance in f that can be explained by observation u), QR corresponds to the QR decomposition of a matrix, P is a permutation matrix computed during an $LDL^T$, QR, or Cholesky decomposition, $v_a$ is the information vector corresponding to $y_a$ and v is the information vector. However, the data can be updated in any manner.

In some variants, determining the GNSS corrections can include rebasing (and/or updating) the inducing points of the GNSS corrections model, which can be particularly, but not exclusively, beneficial for sparse Gaussian processes. Rebasing the inducing points functions to translate a set of inducing points, u, and to be relative to some new inducing points, z. Rebasing the inducing points can include switching inducing points by predicting the prior for the new inducing points then recomputing the quantities stored in a fit. In a specific example, rebasing the inducing points can include: computing the posterior prediction associated with inducing points z (e.g., $z \sim N(m_z, P_{zz})$); computing $v_z = K_{zz}^{-1} m_z$, computing $P_{zz}^{-1/2} K_{zz}$, computing the LDLT of $(P_{zz}^{-1/2} K_{zz})^T (P_{zz}^{-1/2} K_{zz})$; and setting $P_{zz} = C^T$ and $R_z = D^{1/2} L^T$; where D is a diagonal matrix, R is a residual matrix, and C is a Cholesky matrix. However, the inducing points can be rebased in any manner.

S130 can include validating the GNSS corrections S135. The GNSS corrections can be valid indefinitely, for a validation time (e.g., a predetermined time), and/or be valid for any suitable time. The GNSS corrections are preferably validated using a validation dataset (e.g., a subset of the dataset used to generate the GNSS corrections, a distinct set of data from that used to generate the GNSS corrections, etc.), but can be validated against a different GNSS corrections model (e.g., different parameters, different hyperparameters, different model assumptions, etc.), and/or in any manner. The GNSS corrections are preferably validated when a residual of the GNSS corrections as applied to the validation dataset is less than a threshold. When the residual of the GNSS corrections as applied to the validation dataset is greater than the threshold the GNSS corrections can be recalculated, the GNSS corrections model can be updated (e.g., reparametrized, hyperparameters redetermined, etc.), additional data can be acquired, outliers detection can be repeated, a flag or warning can be included with the GNSS corrections (e.g., an unvalidated flag, an estimated accuracy or integrity accessible flag, a GNSS corrections unavailable flag, etc.), and/or any suitable response can occur. However, the GNSS corrections can be otherwise validated.

In some examples, the GNSS corrections can be validated (and/or generated) as disclosed in U.S. patent application Ser. No. 16/865,077 titled 'Systems and Methods for High-Integrity Satellite Positioning' filed 1 May 2020.

S140 includes transmitting the set of GNSS corrections. S140 functions to transmit the GNSS corrections to a mobile receiver for which GNSS corrections are desired. GNSS corrections can be transmitted wirelessly (e.g., over a cellular, Wi-Fi, satellite, etc. network), over a wired connection, and/or in any manner.

S150 includes correcting a position estimate using the set of GNSS corrections. The position estimate can be calculated at the mobile receiver, at a computing system (e.g., positioning module associated with a corrections generator), and/or at any suitable component. In some embodiments, it can be desirable for the position estimate to be calculated by the GNSS corrections generation source (while this may have higher latency, the GNSS corrections generation may in some cases be performed by substantially more powerful computers than positioning calculation at the receiver). In this case, S150 includes receiving a position estimate from a receiver and correcting this position estimate using the GNSS corrections generated in S130 (after which the corrected position may be transmitted back to the receiver and/or to any other location).

The methods of the preferred embodiment and variations thereof can be embodied and/or implemented at least in part as a machine configured to receive a computer-readable medium storing computer-readable instructions. The instructions are preferably executed by computer-executable components preferably integrated with a system for GNSS corrections generation. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

I claim:

1. A method for determining a mobile receiver position comprising:
   receiving, from a set of reference stations, a set of satellite observations; and
   generating a set of GNSS corrections using a set of Gaussian processes, wherein inputs to the set of Gaussian processes comprise a set of covariance functions relating undifferenced and uncombined satellite observations from the set of satellite observations, wherein the set of covariance functions comprise:
      a covariance function relating satellite orbit errors between two satellite observations, comprising: a constant function combined with a squared exponential function combined with an Ornstein-Uhlenbeck function;
      a covariance function relating hardware bias between two satellite observations, comprising: a squared exponential bias function combined with an Ornstein-Uhlenbeck function;
      a covariance function relating clock errors between two satellite observations comprising an Ornsten-Uhlenbeck function; and
      a covariance function relating atmospheric delays comprising a squared exponential function;
   wherein a mobile receiver receives a second set of satellite observations, corrects the second set of satellite observations using the set of GNSS corrections; and determines the mobile receiver position using the set of corrected satellite observations.

2. The method of claim 1, wherein the covariance functions relating atmospheric delays comprises:
   a radial covariance function relating a first pierce point associated with a first satellite observation and a second pierce point associated with a second satellite observation comprising a squared exponential function based on a great circle distance between the first pierce point and second pierce point; and
   an altitude covariance function relating an altitude of the first pierce point and an altitude of the second pierce point.

3. The method of claim 1, wherein one or more hyperparameters associated with at least one of the covariance functions is determined by:
   selecting a set of tuning hyperparameters and a tuning dataset of satellite observations;
   predicting a set of predicted GNSS corrections using the set of tuning hyperparameters;
   comparing the set of predicted GNSS corrections with a set of subsequently determined actual GNSS corrections; and
   storing a tuning hyperparameter of the set of tuning hyperparameters that predicted the actual GNSS corrections above a threshold accuracy.

4. The method of claim 1, wherein the set of satellite observations comprises at least 1,000 satellite observations.

5. A method for generating GNSS corrections comprising:
   receiving, from a set of reference stations, a set of satellite observations corresponding to one or more satellites of one or more satellite constellations;
   generating a set of GNSS corrections using a GNSS corrections model, wherein the GNSS corrections model comprises a Gaussian process, wherein inputs to the GNSS corrections model comprise undifferenced and uncombined satellite observations from the set of satellite observations;
   constraining a GNSS correction associated with a first time and a GNSS correction associated with a second time to ensure a smooth transition between the GNSS corrections between the first and second time; and
   determining a position of a GNSS receiver based on the set of GNSS corrections and a set of satellite observations received by the GNSS receiver.

6. The method of claim 5, further comprising estimating an atmospheric delay at each reference station of the set of reference stations using a precise point precision (PPP) filter, wherein the inputs to the GNSS corrections model further comprise the atmospheric delay at each reference station of the set of reference stations.

7. The method of claim 6, wherein estimating the atmospheric delay at each reference station comprises modelling a total electron content of the ionosphere with a multi-shell model.

8. The method of claim 7, wherein a covariance function relating a first pierce point associated with a first satellite observation of the set of satellite observations and a second pierce point associated with a second satellite observation of the set of satellite observations depends on a great circle distance between the first and second pierce points of a single shell of the multi-shell model.

9. The method of claim 7, wherein a covariance function associated with the Gaussian process comprises a sum of:
   a covariance function relating the satellite observations received at each reference station;
   a covariance function relating satellite observations received from each satellite; and a covariance function corresponding to a convolution between covariance functions associated with each shell of the multi-shell model, wherein the covariance functions associated with each shell of the multi-shell model corresponds to an altitude covariance and a radial covariance.

10. The method of claim 5, wherein the set of GNSS corrections are generated without using a Kalman filter.

11. The method of claim 6, wherein a covariance function relating a first pierce point associated with a first satellite observation and a second pierce point associated with a second satellite observation comprises a squared exponential function.

12. The method of claim 5, wherein the Gaussian process comprises a sparse Gaussian process, wherein the sparse Gaussian process comprises a set of inducing points, wherein the set of inducing points are associated with variables of the set of reference stations.

13. The method of claim 12, further comprising rebasing the set of inducing points by:
calculating a posterior prediction associated with a second set of inducing points; and
scaling a prior associated with the set of inducing points based on the posterior prediction.

14. The method of claim 5, further comprising identifying one or more outliers in the set of satellite observations and removing the outliers from the set of satellite observations.

15. The method of claim 14, wherein identifying the outliers comprises identifying the outlier using a random sample consensus (RANSAC) method.

16. The method of claim 6, wherein the set of GNSS corrections are operable to correct for at least one of: satellite clock error, satellite orbit error, satellite hardware bias, satellite antenna phase windup, phase center offset (PCO), phase center variation (PCV), solid earth tides, solid earth pole tides, ocean tidal loading, ionosphere delays, troposphere delays, receiver clock error, receiver hardware bias, receiver antenna phase windup/PCO/PCV, carrier phase ambiguity, and multi-path effects.

17. The method of claim 5, further comprising determining a parameter of the GNSS corrections model by:
selecting a set of tuning parameters;
predicting a set of predicted GNSS corrections using the set of tuning parameters;
comparing the set of predicted GNSS corrections with a set of subsequently determined actual GNSS corrections; and
storing a tuning parameter of the set of tuning parameters that predicted the actual GNSS corrections above a threshold accuracy.

18. The method of claim 5, further comprising validating the GNSS corrections by:
selecting a set of validation satellite observations, wherein the set of validation satellite observations are not used to generate the GNSS corrections;
estimating a GNSS correction associated with the set of validation satellite observations based on the GNSS correction model;
when a residual associated with the GNSS correction associated with the set of validation satellite observations is less than a threshold, validating the GNSS corrections.

19. The method of claim 5, wherein constraining the GNSS corrections at the first and second time comprises constraining a mean quantity of satellite observations detected at a master reference station of the set of reference stations to a common value at the first and second times.

20. A method for generating GNSS corrections comprising:
receiving, from a set of reference stations, a set of satellite observations corresponding to one or more satellites of one or more satellite constellations;
generating a set of GNSS corrections using a GNSS corrections model, wherein the GNSS corrections model comprises a Gaussian process, wherein inputs to the GNSS corrections model comprise undifferenced and uncombined satellite observations from the set of satellite observations;
constraining a GNSS correction associated with a first time and a GNSS correction associated with a second time to ensure a smooth transition between the GNSS corrections between the first and second time;
validating the GNSS corrections by:
selecting a set of validation satellite observations, wherein the set of validation satellite observations are not used to generate the GNSS corrections;
estimating a GNSS correction associated with the set of validation satellite observations based on the GNSS correction model; and
when a residual associated with the GNSS correction associated with the set of validation satellite observations is less than a threshold, validating the GNSS corrections; and
determining a position of a GNSS receiver based on the set of GNSS corrections and a set of satellite observations received by the GNSS receiver.

* * * * *